(12) United States Patent
Alshina et al.

(10) Patent No.: US 8,929,673 B2
(45) Date of Patent: *Jan. 6, 2015

(54) METHOD AND APPARATUS FOR ENCODING AND DECODING IMAGE BY USING ROTATIONAL TRANSFORM

(71) Applicant: Samsung Electronics Co., Ltd., Gyeonggi-do (KR)

(72) Inventors: Elena Alshina, Suwon-si (KR); Alexander Alshin, Suwon-si (KR); Vadim Seregin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,711

(22) Filed: Jun. 18, 2013

(65) Prior Publication Data

US 2013/0279580 A1    Oct. 24, 2013

Related U.S. Application Data

(63) Continuation of application No. 12/914,181, filed on Oct. 28, 2010, now Pat. No. 8,467,625.

(30) Foreign Application Priority Data

Oct. 28, 2009    (KR) .................. 10-2009-0102718

(51) Int. Cl.
| | |
|---|---|
| *G06K 9/36* | (2006.01) |
| *H04N 19/625* | (2014.01) |
| *H04N 19/119* | (2014.01) |
| *H04N 19/14* | (2014.01) |
| *H04N 19/18* | (2014.01) |
| *H04N 19/122* | (2014.01) |
| *H04N 19/176* | (2014.01) |
| *H04N 19/61* | (2014.01) |

(52) U.S. Cl.
CPC ... *H04N 19/00812* (2013.01); *H04N 19/00072* (2013.01); *H04N 19/00157* (2013.01); *H04N 19/00296* (2013.01); *H04N 19/00084* (2013.01); *H04N 19/00278* (2013.01); *H04N 19/00781* (2013.01)
USPC .......................... 382/248; 382/232; 382/233

(58) Field of Classification Search
None
See application file for complete search history.

(56) References Cited

U.S. PATENT DOCUMENTS

| | | | |
|---|---|---|---|
| 5,253,056 | A | 10/1993 | Puri et al. |
| 6,696,993 | B2 | 2/2004 | Karczewicz |

(Continued)

FOREIGN PATENT DOCUMENTS

| | | |
|---|---|---|
| CN | 101107862 A | 1/2008 |
| CN | 101401435 A | 4/2009 |

(Continued)

OTHER PUBLICATIONS

An international search report dated Jun. 1, 2011 in counterpart application PCT/KR2010/007487.

(Continued)

*Primary Examiner* — Li Liu
(74) *Attorney, Agent, or Firm* — Sughrue Mion, PLLC

(57) ABSTRACT

An image encoding method includes generating a first frequency coefficient matrix by transforming a predetermined block to a frequency domain; determining whether the first frequency coefficient matrix includes coefficients whose absolute values are greater than a predetermined value; generating a second frequency coefficient matrix by selectively partially switching at least one of rows and columns of the first frequency coefficient matrix according to an angle parameter based on a determination result; and selectively encoding the second frequency coefficient matrix based on the determination result.

4 Claims, 14 Drawing Sheets

(56) References Cited

U.S. PATENT DOCUMENTS

| | | |
|---|---|---|
| 6,907,079 B2 | 6/2005 | Gomila et al. |
| 7,146,053 B1 | 12/2006 | Rijavec et al. |
| 7,925,108 B2 | 4/2011 | Inagaki |
| 2002/0006162 A1* | 1/2002 | Nakao et al. ............. 375/240.16 |
| 2004/0028227 A1 | 2/2004 | Yu |
| 2007/0133889 A1 | 6/2007 | Horie et al. |
| 2007/0189626 A1 | 8/2007 | Tanizawa et al. |
| 2008/0310504 A1 | 12/2008 | Ye et al. |
| 2009/0010559 A1 | 1/2009 | Inagaki |
| 2009/0110317 A1 | 4/2009 | Alshina et al. |
| 2012/0082391 A1 | 4/2012 | Fernandes |

FOREIGN PATENT DOCUMENTS

| | | |
|---|---|---|
| KR | 10-1994-0001715 A | 11/1994 |
| KR | 1020070110517 A | 11/2007 |
| KR | 1020080085909 A | 9/2008 |
| WO | 2009054594 A1 | 4/2009 |

OTHER PUBLICATIONS

Ankur Saxena. Felix C. Fernandes "Jointly optimal intra prediction and adaptive primary transform", Joint Collaborative Team on Video Coding (JCT-VC) of ITU-T SG16 WP3 and ISO/IEC JTC 1/SC29/WG11, 3rd Meeting: Guangzhou, CN, Oct. 7-15, 2010, Document: JCTVC-C108.

Jingning Han, Saxena, A.; Rose, K. "Towards jointly optimal spatial prediction and adaptive transform in video/image coding", ICASSP Mar. 2010.

Communication dated May 19, 2014, issued by The State Intellectual Property Office of P.R. China in counterpart Chinese Application No. 201080049221.8.

Communication, dated Feb. 25, 2014, issued by the Canadian Patent Office in counterpart Canadian Application No. 2,777,588.

Communication, dated May 2, 2014, issued by the European Patent Office in counterpart European Application No. 10827105.7.

Communication, issued by the Japanese Patent Office, Dated Aug. 5, 2014, In counterpart Japanese Application No. 2012-536681.

* cited by examiner

ENCODING UNIT

PREDICTION UNIT

PREDICTION UNIT

TRANSFORMATION UNIT

4x4 TRANSFORM

8x8 TRANSFORM

8x8 TRANSFORM

METHOD AND APPARATUS FOR ENCODING AND DECODING IMAGE BY USING ROTATIONAL TRANSFORM

CROSS-REFERENCE TO RELATED PATENT APPLICATION

This is a Continuation of application Ser. No. 12/914,181 filed Oct. 28, 2010, which claims priority from Korean Patent Application No. 10-2009-0102718, filed Oct. 28, 2009, in the Korean Intellectual Property Office, the disclosure of which is incorporated herein in its entirety by reference.

BACKGROUND

1. Field

Apparatuses and methods consistent with exemplary embodiments relate to a method and an apparatus for encoding and decoding an image, and more particularly, to a method and an apparatus for encoding and decoding coefficients generated by transforming an image from a pixel domain to a frequency domain.

2. Description of the Related Art

In most methods and apparatuses for encoding and decoding an image, an image of a pixel domain is transformed to a frequency domain and then is encoded to compress the image. Discrete cosine transform (DCT) is a well-known technology used to compress audio/video (AV) data. In recent years, many attempts to find more efficient coding methods have been made. In audio coding, parametric coding performs better than DCT and, in two-dimensional (2D) data, Karhunen Loeve transform (KLT) has a minimum bit size but has a large overhead size.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

Exemplary embodiments provide a method and apparatus for encoding and decoding an image, and a computer readable recording medium having recorded thereon a computer program for executing the method.

According to an aspect of an exemplary embodiment, there is provided a method of encoding an image, the method including generating a first frequency coefficient matrix by transforming a predetermined block to a frequency domain; determining whether the first frequency coefficient matrix includes coefficients whose absolute values are greater than a predetermined value; generating a second frequency coefficient matrix by selectively partially switching at least one of rows or columns of the first frequency coefficient matrix according to a predetermined angle parameter based on a result of the determining; and selectively encoding the second frequency coefficient matrix based on the result of the determining, wherein the angle parameter indicates a degree of partial switching between the at least one of rows or columns.

The determining may include determining whether the first frequency coefficient matrix includes non zero coefficients.

The determining may further include determining whether the predetermined block is a block of a bi-directional predicted slice (B slice).

The determining may further include determining whether the predetermined block is a block predicted by performing intra prediction.

The selective encoding may include quantizing the second frequency coefficient matrix if the first frequency coefficient matrix includes non zero coefficients; and entropy-encoding the quantized second frequency coefficient matrix and information about the angle parameter.

According to another aspect of an exemplary embodiment, there is provided a method of decoding an image, the method including decoding information indicating whether a first frequency coefficient matrix of a predetermined block includes coefficients whose absolute values are greater than a predetermined value; selectively decoding data of a second frequency coefficient matrix based on the decoded information; restoring the first frequency coefficient matrix by selectively partially switching at least one of rows or columns of the second frequency coefficient matrix according to a predetermined angle parameter based on the decoded information; and restoring the predetermined block by transforming the first frequency coefficient matrix to a pixel domain, wherein the angle parameter indicates a degree of partial switching between the at least one of rows or columns.

According to another aspect of an exemplary embodiment, there is provided an apparatus for encoding an image, the apparatus including a first transformer for generating a first frequency coefficient matrix by transforming a predetermined block to a frequency domain; a second transformer for determining whether the first frequency coefficient matrix includes coefficients whose absolute values are greater than a predetermined value, and generating a second frequency coefficient matrix by selectively partially switching at least one of rows or columns of the first frequency coefficient matrix according to a predetermined angle parameter based on a determination result; and an encoder for selectively encoding the second frequency coefficient matrix based on the determination result, wherein the angle parameter indicates a degree of partial switching between the at least one of rows or columns.

According to another aspect of an exemplary embodiment, there is provided an apparatus for decoding an image, the apparatus including a decoder for decoding information indicating whether a first frequency coefficient matrix of a predetermined block includes coefficients whose absolute values are greater than a predetermined value, and selectively decoding data of a second frequency coefficient matrix based on the decoded information; a first inverse transformer for restoring the first frequency coefficient matrix by selectively partially switching at least one of rows or columns of the second frequency coefficient matrix according to a predetermined angle parameter based on the decoded information; and a second inverse transformer for restoring the predetermined block by transforming the first frequency coefficient matrix to a pixel domain, wherein the angle parameter indicates a degree of partial switching between the at least one of rows or columns.

According to another aspect of an exemplary embodiment, there is provided a computer readable recording medium having recorded thereon a computer program for executing the image encoding method and/or the image decoding method.

BRIEF DESCRIPTION OF THE DRAWINGS

The above and/or other aspects of exemplary embodiments will become more apparent by describing certain exemplary embodiments, with reference to the accompanying drawings, in which.

DETAILED DESCRIPTION OF EXEMPLARY EMBODIMENTS

Figure 1:
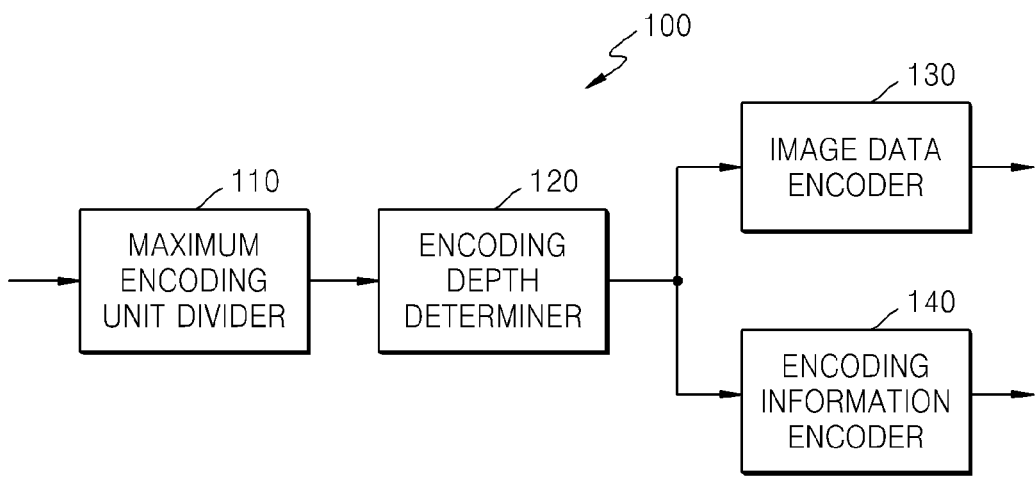
FIG. 1 is a block diagram of an apparatus for encoding an image, according to an exemplary embodiment.

Certain exemplary embodiments are described in greater detail below with reference to the accompanying drawings. Expressions such as "at least one of," when preceding a list of elements, modify the entire list of elements and do not modify the individual elements of the list. In the present specification, an "image" may denote a still image for a video or a moving image, that is, the video itself.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

FIG. 1 is a block diagram of an image encoding apparatus 100 for encoding an image, according to an exemplary embodiment. The image encoding apparatus 100 may be implemented as a hardware apparatus such as, for example, a processor of a computer or a computer system. The image encoding apparatus 100 may be also implemented as a software module residing on the computer system.

Referring to FIG. 1, the image encoding apparatus 100 includes a maximum encoding unit divider 110, an encoding depth determiner 120, an image data encoder 130, and an encoding information encoder 140 which may be implemented, for example, as hardware or software modules integrated within the image encoding apparatus 100 or separately from the image encoding apparatus 100.

The maximum encoding unit divider 110 may divide a current frame or slice based on a maximum coding unit that is a coding unit of the largest size. That is, the maximum encoding unit divider 110 may divide the current frame or slice into at least one maximum coding unit.

According to an exemplary embodiment, a coding unit may be represented using a maximum coding unit and a depth. As described above, the maximum coding unit indicates a coding unit having the largest size from among coding units of the current frame, and the depth indicates a degree of hierarchically decreasing the coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a kth depth may include a plurality of sub coding units of a (k+n)th depth (k and n are integers equal to or greater than 1).

According to an increase of the size of a frame to be encoded, encoding an image in a greater coding unit may cause a higher image compression ratio. However, if a greater coding unit is fixed, an image may not be efficiently encoded by reflecting continuously changing image characteristics.

For example, when a smooth area such as the sea or sky is encoded, the greater a coding unit is, the more a compression ratio may increase. However, when a complex area such as people or buildings is encoded, the smaller a coding unit is, the more a compression ratio may increase.

Accordingly, in an exemplary embodiment, a different maximum image coding unit and a different maximum depth are set for each frame or slice. Since a maximum depth denotes the maximum number of times by which a coding unit may decrease, the size of each minimum coding unit included in a maximum image coding unit may be variably set according to a maximum depth. The maximum depth may be determined differently for each frame or slice or for each maximum coding unit.

The encoding depth determiner 120 determines a division shape of the maximum coding unit. The division shape may be determined based on calculation of rate-distortion (RD) costs. The determined division shape of the maximum coding unit is provided to the encoding information encoder 140, and image data according to maximum coding units is provided to the image data encoder 130.

A maximum coding unit may be divided into sub coding units having different sizes according to different depths, and the sub coding units having different sizes, which are included in the maximum coding unit, may be predicted or frequency-transformed based on processing units having different sizes. In other words, the image encoding apparatus 100 may perform a plurality of processing operations for image encoding based on processing units having various sizes and various shapes. To encode image data, processing operations such as prediction, transform, and entropy encoding are performed, wherein processing units having the same size or different sizes may be used for every operation.

For example, the image encoding apparatus 100 may select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of a height and a width of a coding unit is equally divided by two. Hereinafter, a processing unit, which is the base of prediction, is defined as a prediction unit.

A prediction mode may be at least one of an intra mode, an inter mode, and a skip mode, and a specific prediction mode may be performed for only a prediction unit having a specific size or a specific shape. For example, the intra mode may be performed for only prediction units having the sizes of 2N×2N and N×N which have the shape of a square. Further, the skip mode may be performed for only a prediction unit having the size of 2N×2N. If a plurality of prediction units exists in a coding unit, the prediction mode with the least encoding errors may be selected after performing prediction for every prediction unit.

Alternatively, the image encoding apparatus 100 may perform frequency transform on image data based on a processing unit having a different size from a coding unit. For the frequency transform in the coding unit, the frequency transform may be performed based on a processing unit having a size equal to or smaller than that of the coding unit. Hereinafter, a processing unit, which is the base of frequency transform, is defined as a transform unit. The frequency transform may be discrete cosine transform (DCT) or Karhunen Loeve transform (KLT).

The encoding depth determiner 120 may determine sub coding units included in a maximum coding unit using RD optimization based on a Lagrangian multiplier. In other words, the encoding depth determiner 120 may determine which shape a plurality of sub coding units divided from the maximum coding unit has, wherein the plurality of sub coding units has different sizes according to the depths of sub coding units. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transform unit of the sub coding unit.

The information about the division shape of the maximum coding unit may be flag information, indicating whether each coding unit is divided. For example, when the maximum coding unit is divided and encoded, information indicating whether the maximum coding unit is divided is encoded. Also, when a sub coding unit divided from the maximum coding unit is divided and encoded, information indicating whether the sub coding unit is divided is encoded.

Since sub coding units having different sizes exist for each maximum coding unit and information about an encoding mode is determined for each sub coding unit, information about at least one encoding mode may be determined for one maximum coding unit.

The image encoding apparatus 100 may generate sub coding units by equally dividing the height and width of a maximum coding unit by two according to an increase of depth. That is, when the size of a coding unit of a kth depth is 2N×2N, the size of a coding unit of a (k+1)th depth is N×N.

Accordingly, the image encoding apparatus 100 may determine an optimal division shape for each maximum coding unit based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions may be more efficiently encoded.

Figure 2:
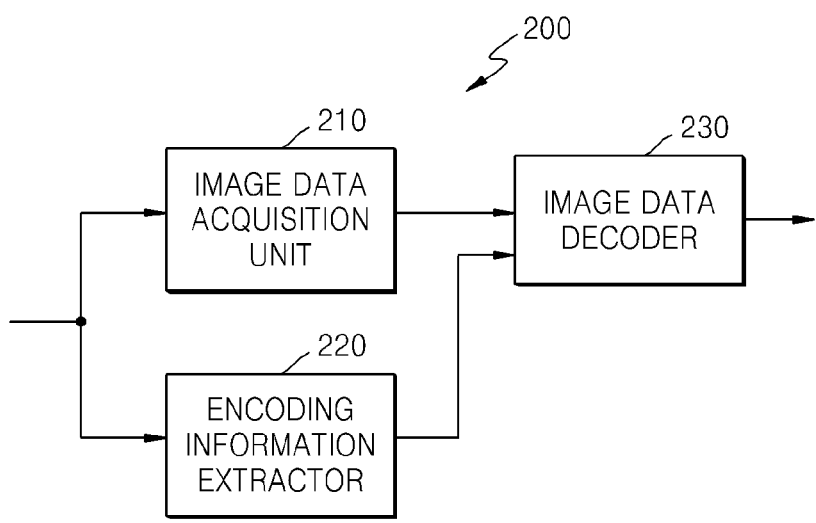
FIG. 2 is a block diagram of an apparatus for decoding an image, according to an exemplary embodiment.

FIG. 2 is a block diagram of an image decoding apparatus 200 for decoding an image according to an exemplary embodiment. The image decoding apparatus 200 may be implemented as a hardware apparatus such as, for example, a processor of a computer, or a computer system. The image decoding apparatus 200 may be also implemented as a software module residing on the computer system.

Referring to FIG. 2, the image decoding apparatus 200 includes an image data acquisition unit 210, an encoding information extractor 220, and an image data decoder 230 which may be implemented, for example, as hardware or software modules integrated within the image decoding apparatus 200 or separately from the image encoding apparatus 200.

The image data acquisition unit 210 acquires image data according to maximum coding units by parsing a bitstream received by the image decoding apparatus 200 and outputs the image data to the image data decoder 230. The image data acquisition unit 210 may extract information about a maximum coding unit of a current frame or slice from a header of the current frame or slice. In other words, the image data acquisition unit 210 divides the bitstream in the maximum coding unit so that the image data decoder 230 may decode the image data according to maximum coding units.

The encoding information extractor 220 extracts information about a maximum coding unit, a maximum depth, a division shape of the maximum coding unit, an encoding mode of sub coding units from the header of the current frame by parsing the bitstream received by the image decoding apparatus 200. The information about a division shape and the information about an encoding mode are provided to the image data decoder 230.

The information about a division shape of the maximum coding unit may include information about sub coding units having different sizes according to depths and included in the maximum coding unit, and may be flag information indicating whether each coding unit is divided.

The information about an encoding mode may include information about a prediction unit according to sub coding units, information about a prediction mode, and information about a transform unit.

The image data decoder 230 restores the current frame by decoding image data of every maximum coding unit based on the information extracted by the encoding information extractor 220.

The image data decoder 230 may decode sub coding units included in a maximum coding unit based on the information about a division shape of the maximum coding unit. A decoding process may include a prediction process including intra prediction and motion compensation and an inverse transform process.

The image data decoder 230 may perform intra prediction or inter prediction based on information about a prediction unit and information about a prediction mode to predict a prediction unit. The image data decoder 230 may also perform inverse transform for each sub coding unit based on information about a transform unit of a sub coding unit.

Figure 3:
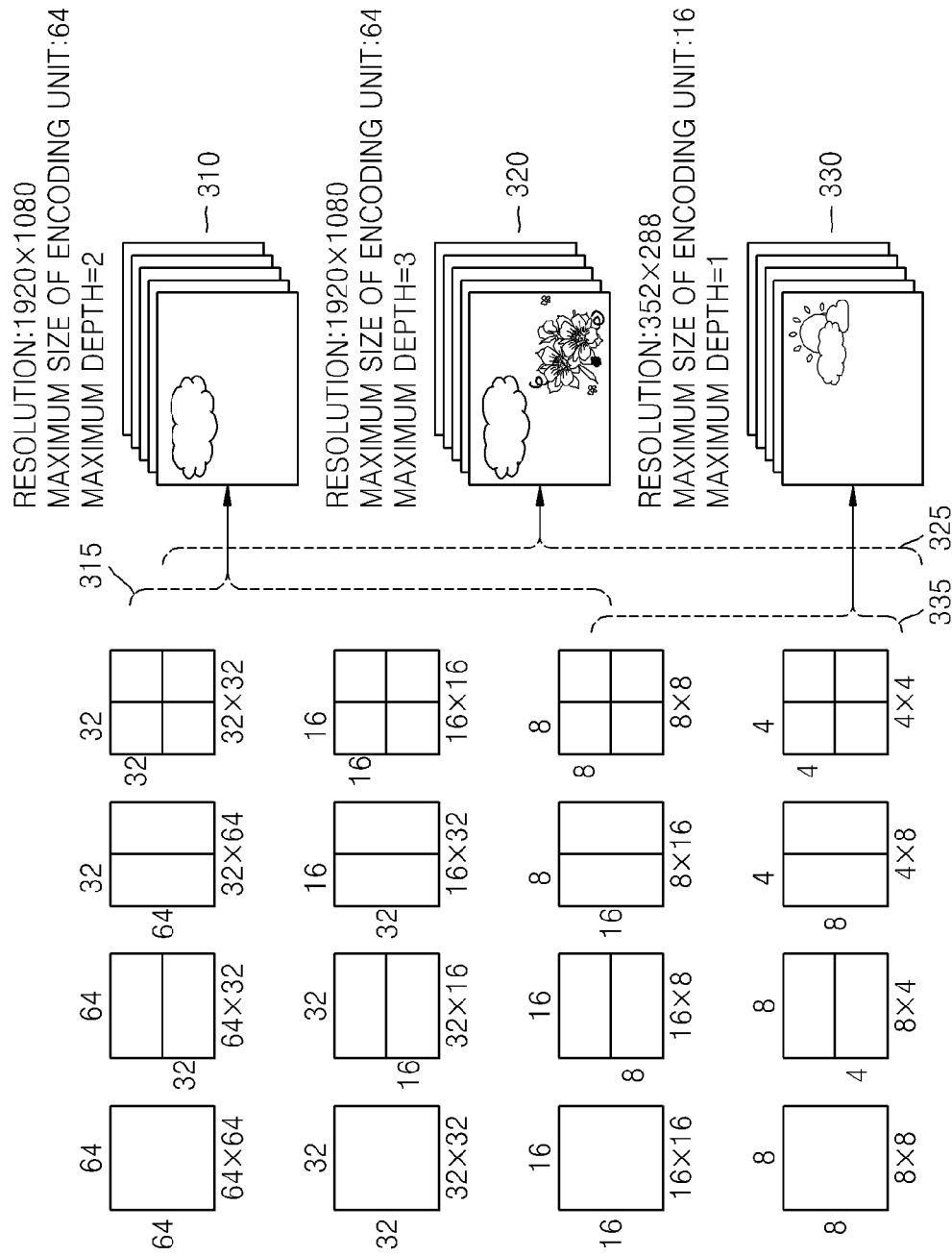
FIG. 3 illustrates hierarchical coding units according to an exemplary embodiment.

FIG. 3 illustrates hierarchical coding units according to an exemplary embodiment.

Referring to FIG. 3, the hierarchical coding units may include coding units whose widths and heights are 64×64, 32×32, 16×16, 8×8, and 4×4. Besides these coding units having perfect square shapes, coding units whose widths and heights are 64×32, 32×64, 32×16, 16×32, 16×8, 8×16, 8×4, and 4×8 may also exist.

Referring to FIG. 3, for image data set 310 whose resolution is 1920×1080, the size of a maximum coding unit is set to 64×64, and a maximum depth is set to 2.

For image data set 320 whose resolution is 1920×1080, the size of a maximum coding unit is set to 64×64, and a maximum depth is set to 3. For image data set 330 whose resolution is 352×288, the size of a maximum coding unit is set to 16×16, and a maximum depth is set to 1.

When the resolution is high or the amount of data is great, a maximum size of a coding unit may be set relatively great to increase a compression ratio and reflect image characteristics more precisely. Accordingly, for the image data sets 310 and 320 having higher resolution than the image data set 330, 64×64 may be selected as the size of a maximum coding unit.

A maximum depth indicates the total number of layers in the hierarchical coding units. Since the maximum depth of the image data set 310 is 2, a coding unit 315 of the image data set 310 may include a maximum coding unit whose longer axis size is 64 and sub coding units whose longer axis sizes are 32 and 16, according to an increase of a depth.

On the other hand, since the maximum depth of the image data set 330 is 1, a coding unit 335 of the image data set 330 may include a maximum coding unit whose longer axis size is 16 and coding units whose longer axis sizes is 8, according to an increase of a depth.

However, since the maximum depth of the image data 320 is 3, a coding unit 325 of the image data set 320 may include a maximum coding unit whose longer axis size is 64 and sub coding units whose longer axis sizes are 32, 16, 8 and 4 according to an increase of a depth. Since an image is encoded based on a smaller sub coding unit as a depth increases, exemplary embodiments are suitable for encoding an image including more minute scenes.

Figure 4:
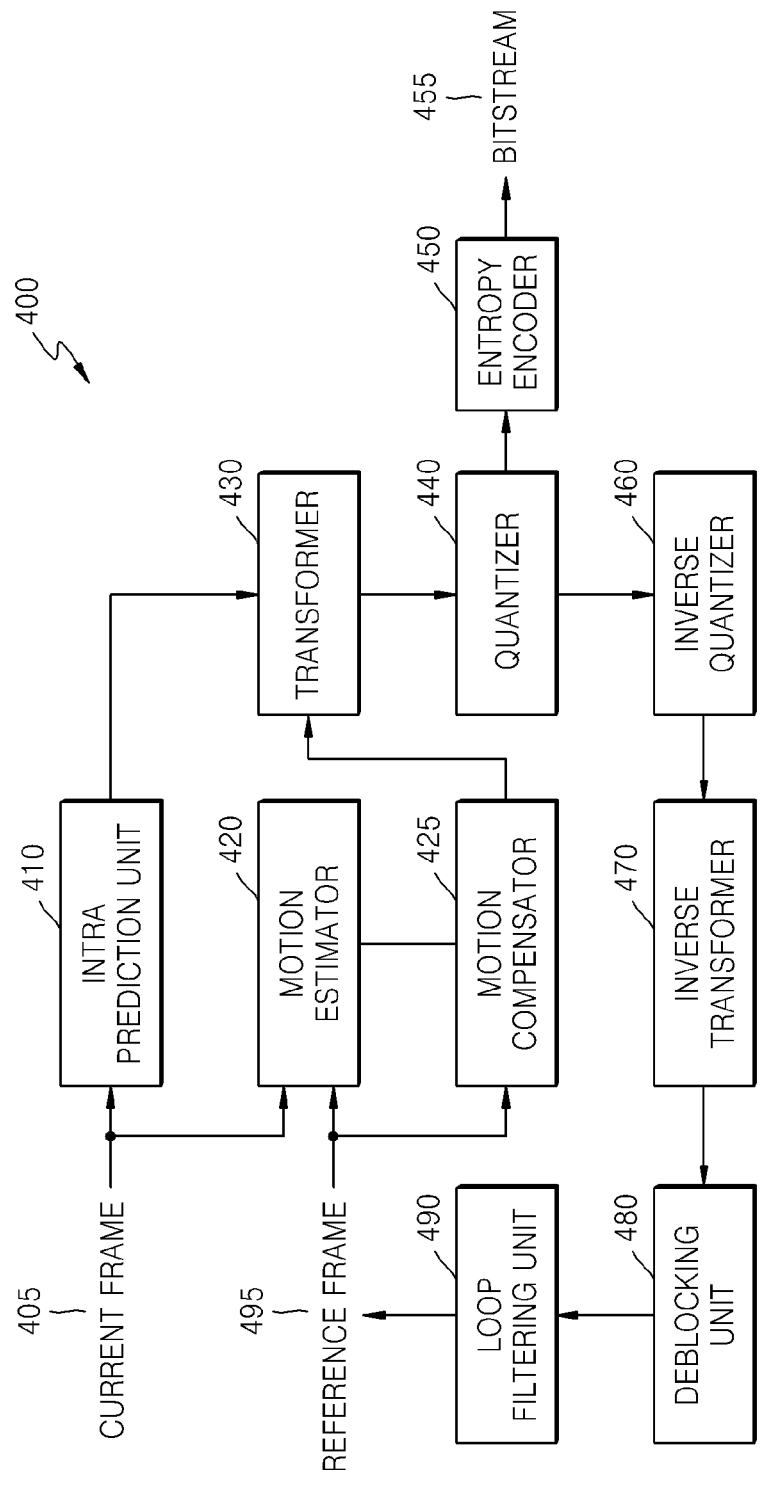
FIG. 4 is a block diagram of an image encoder based on a coding unit, according to an exemplary embodiment.

FIG. 4 is a block diagram of an image encoder 400 based on a coding unit, according to an exemplary embodiment. The image encoder 400 may be implemented as a hardware device such as, for example, a processor of a computer or as a software module residing on the computer system.

An intra prediction unit 410 performs intra prediction on prediction units of the intra mode in a current frame 405, and a motion estimator 420 and a motion compensator 425 perform inter prediction and motion compensation on prediction units of the inter mode using the current frame 405 and a reference frame 495. The intra prediction unit 410, the motion estimator 420, the motion compensator 425, and the reference frame 495 may be implemented, for example, as hardware or software modules integrated within the image encoder 400 or separately from the image encoder 400.

Residual values are generated based on the prediction units output from the intra prediction unit 410, the motion estimator 420, and the motion compensator 425. The generated residual values are output as quantized transform coefficients by passing through a transformer 430 and a quantizer 440.

The quantized transform coefficients are restored to residual values by passing through an inverse quantizer 460 and an inverse transformer 470, and the restored residual values are post-processed by passing through a deblocking unit 480 and a loop filtering unit 490 and output as the reference frame 495. The quantized transform coefficients may be output as a bitstream 455 by passing through an entropy encoder 450.

To perform encoding based on an encoding method according to an exemplary embodiment, the intra prediction unit 410, the motion estimator 420, the motion compensator 425, the transformer 430, the quantizer 440, the entropy encoder 450, the inverse quantizer 460, the inverse transformer 470, the deblocking unit 480, and the loop filtering unit 490 of the image encoder 400 perform image encoding processes based on a maximum coding unit, a sub coding unit according to depths, a prediction unit, and a transform unit.

Figure 5:
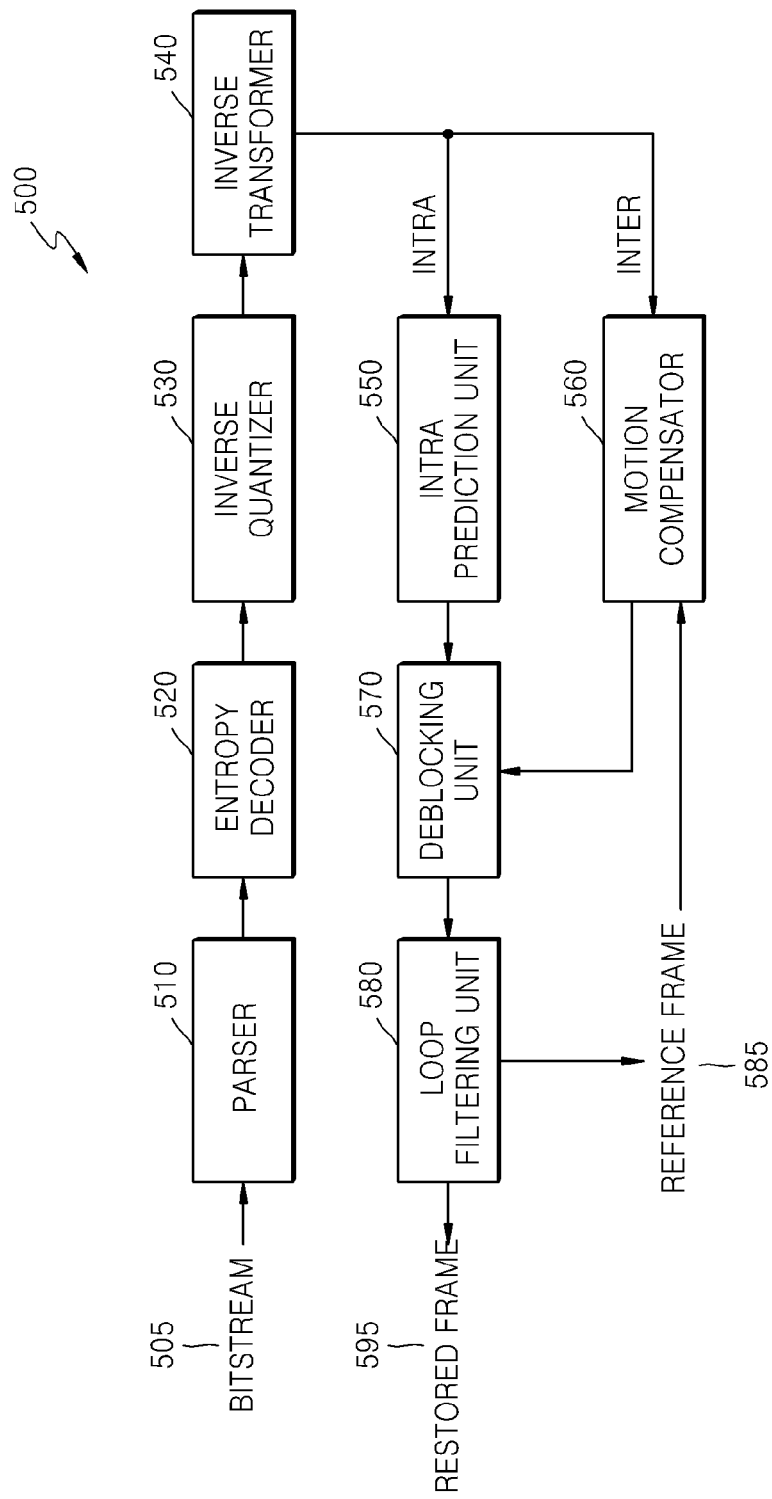
FIG. 5 is a block diagram of an image decoder based on a coding unit, according to an exemplary embodiment.

FIG. 5 is a block diagram of an image decoder 500 based on a coding unit, according to an exemplary embodiment. The image decoder 500 may be implemented as a hardware device such as, for example, a processor of a computer or as a software module residing on the computer system.

A bitstream 505 passes through a parser 510 so that the encoded image data to be decoded and encoding information necessary for decoding are parsed. The encoded image data is output as inverse-quantized data by passing through an entropy decoder 520 and an inverse quantizer 530 and restored to residual values by passing through an inverse transformer 540. The residual values are restored according to coding units by being added to an intra prediction result of an intra prediction unit 550 or a motion compensation result of a motion compensator 560. The restored coding units are used for prediction of next coding units or a next frame by passing through a deblocking unit 570 and a loop filtering unit 580. The parser 510, the entropy decoder 520, the inverse quantizer 530, the inverse transformer 540, the intra prediction unit 550, the compensator 560, the deblocking unit 570, and the loop filtering unit 580 may be implemented, for example, as hardware or software modules integrated within the image decoder 500 or separately from the image decoder 500.

To perform decoding based on a decoding method according to an exemplary embodiment, the parser 510, the entropy decoder 520, the inverse quantizer 530, the inverse transformer 540, the intra prediction unit 550, the motion compensator 560, the deblocking unit 570, and the loop filtering unit 580 of the image decoder 500 perform image decoding processes based on a maximum coding unit, a sub coding unit according to depths, a prediction unit, and a transform unit.

In particular, the intra prediction unit 550 and the motion compensator 560 determine a prediction unit and a prediction mode in a sub coding unit by considering a maximum coding unit and a depth, and the inverse transformer 540 performs inverse transform by considering the size of a transform unit.

Figure 6:
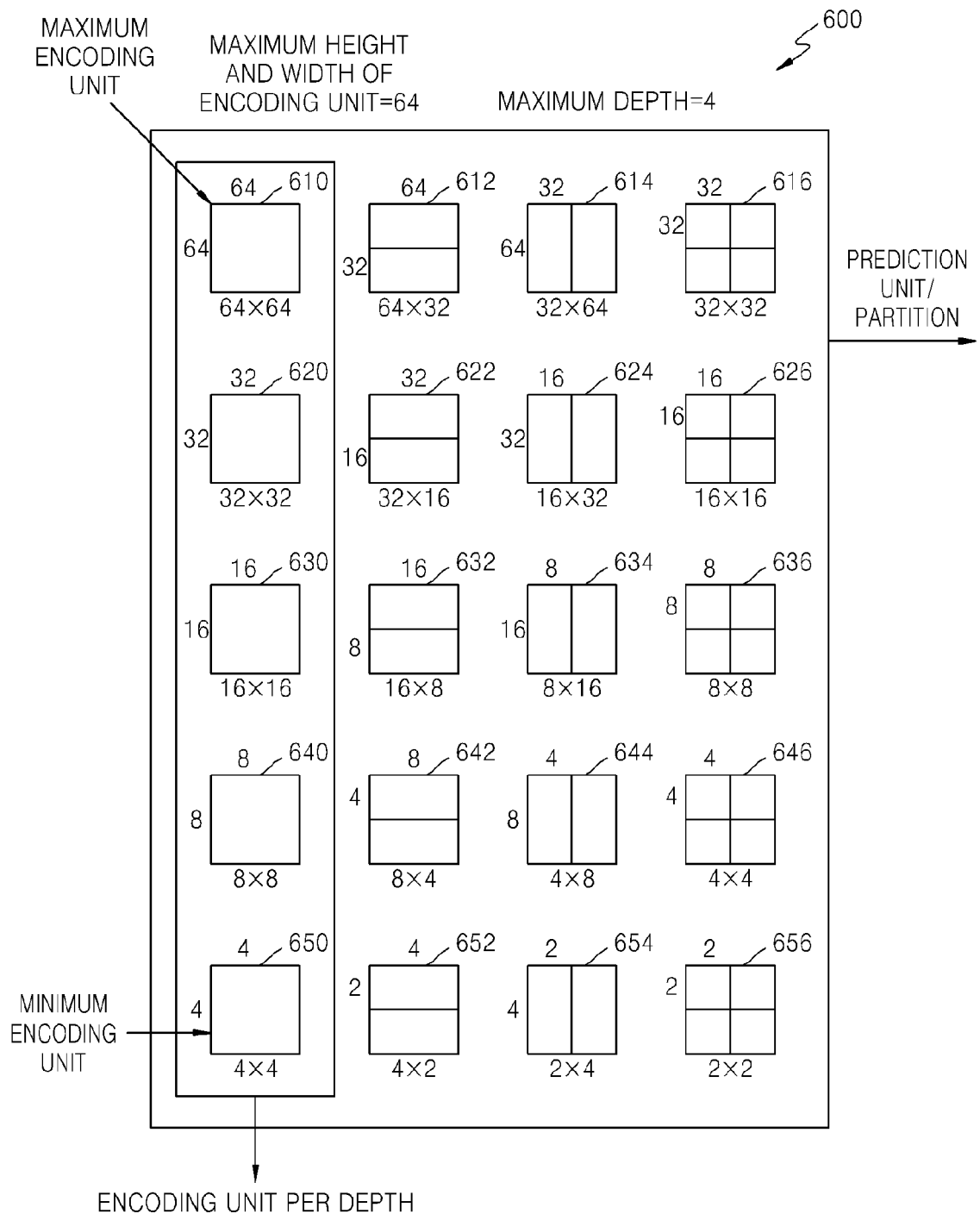
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment.

The image encoding apparatus 100 illustrated in FIG. 1 and the image decoding apparatus 200 illustrated in FIG. 2 use hierarchical coding units to perform encoding and decoding in consideration of image characteristics. A maximum coding unit and a maximum depth may be adaptively set according to the image characteristics or variously set according to requirements of a user.

In FIG. 6, a hierarchical coding unit structure 600 has a maximum encoding unit 610 which is a maximum coding unit whose height and width are 64 and maximum depth is 4. A depth increases along a vertical axis of the hierarchical coding unit structure 600, and as a depth increases, heights and widths of sub coding units 620 to 650 decrease. Prediction units of the maximum encoding unit 610 and the sub coding units 620 to 650 are shown along a horizontal axis of the hierarchical coding unit structure 600.

The maximum encoding unit 610 has a depth of 0 and the size of an coding unit, or a height and a width, of 64×64. A depth increases along the vertical axis, and there exist a first sub coding unit 620 whose size is 32×32 and depth is 1, a second sub coding unit 630 whose size is 16×16 and depth is 2, a third sub coding unit 640 whose size is 8×8 and depth is 3, and a minimum encoding unit 650 whose size is 4×4 and depth is 4. The minimum encoding unit 650 whose size is 4×4 and depth is 4 is a minimum coding unit, and the minimum coding unit may be divided into prediction units, each of which is less than the minimum coding unit.

Referring to FIG. 6, examples of prediction units are shown along the horizontal axis according to each depth. That is, a prediction unit of the maximum encoding unit 610 whose depth is 0 may be a prediction unit whose size is equal to the size 64×64 of the maximum coding unit, or a prediction unit 612 whose size is 64×32, a prediction unit 614 whose size is 32×64, or a prediction unit 616 whose size is 32×32, which has a size smaller than that of the maximum coding unit whose size is 64×64.

A prediction unit of the first sub coding unit 620 whose depth is 1 and size is 32×32 may be a prediction unit whose size is equal to the size 32×32 of the first sub coding unit, or a prediction unit 622 whose size is 32×16, a prediction unit 624 whose size is 16×32, or a prediction unit 626 whose size is 16×16, which has a size smaller than that of the first sub coding unit 620 whose size is 32×32.

A prediction unit of the second sub coding unit 630 whose depth is 2 and size is 16×16 may be a prediction unit whose size is equal to the size 16×16 of the second sub coding unit 630, or a prediction unit 632 whose size is 16×8, a prediction unit 634 whose size is 8×16, or a prediction unit 636 whose size is 8×8, which has a size smaller than that of the second sub coding unit 630 whose size is 16×16.

A prediction unit of the third sub coding unit 640 whose depth is 3 and size is 8×8 may be a prediction unit whose size is equal to the size 8×8 of the third sub coding unit 640 or a prediction unit 642 whose size is 8×4, a prediction unit 644 whose size is 4×8, or a prediction unit 646 whose size is 4×4, which has a size smaller than that of the third sub coding unit 640 whose size is 8×8.

The minimum encoding unit 650 whose depth is 4 and size is 4×4 is a minimum coding unit and a coding unit of a maximum depth. A prediction unit of the minimum encoding unit 650 may be a prediction unit 650 whose size is 4×4, a prediction unit 652 having a size of 4×2, a prediction unit 654 having a size of 2×4, or a prediction unit 656 having a size of 2×2.

Figure 7:
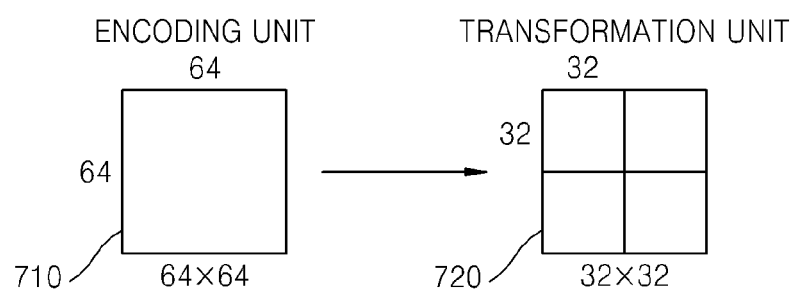
FIG. 7 illustrates a coding unit and a transform unit, according to an exemplary embodiment.

FIG. 7 illustrates a coding unit and a transform unit, according to an exemplary embodiment.

The image encoding apparatus 100 illustrated in FIG. 1 and the image decoding apparatus 200 illustrated in FIG. 2 perform encoding and decoding with a maximum coding unit itself or with sub coding units, which are equal to or smaller than the maximum coding unit, divided from the maximum coding unit. In the encoding and decoding process, the size of a transform unit for frequency transform is selected to be no larger than that of a corresponding coding unit. For example, if a current coding unit 710 has the size of 64×64, frequency transform may be performed using a transformation unit 720 having the size of 32×32.

FIGS. 8A, 8B, 8C, and 8D illustrate division shapes of a coding unit, a prediction unit, and a transform unit, according to an exemplary embodiment.

Figure 8A:
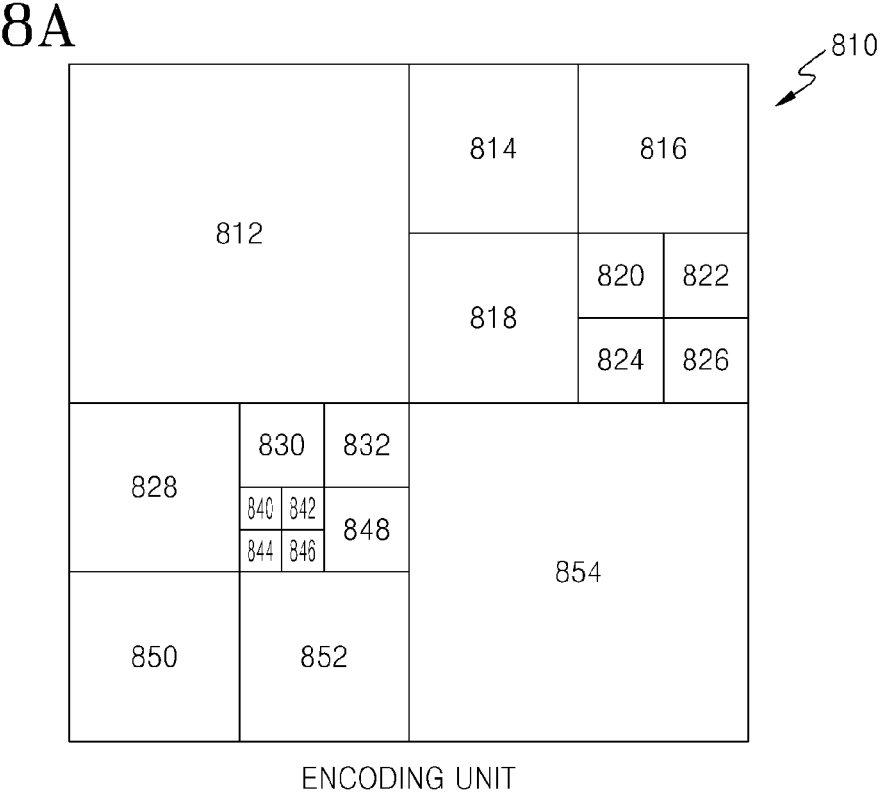
FIGS. 8A, 8B, 8C, and 8D illustrate division shapes of a coding unit, a prediction unit, and a transform unit, according to an exemplary embodiment.
Figure 8B:
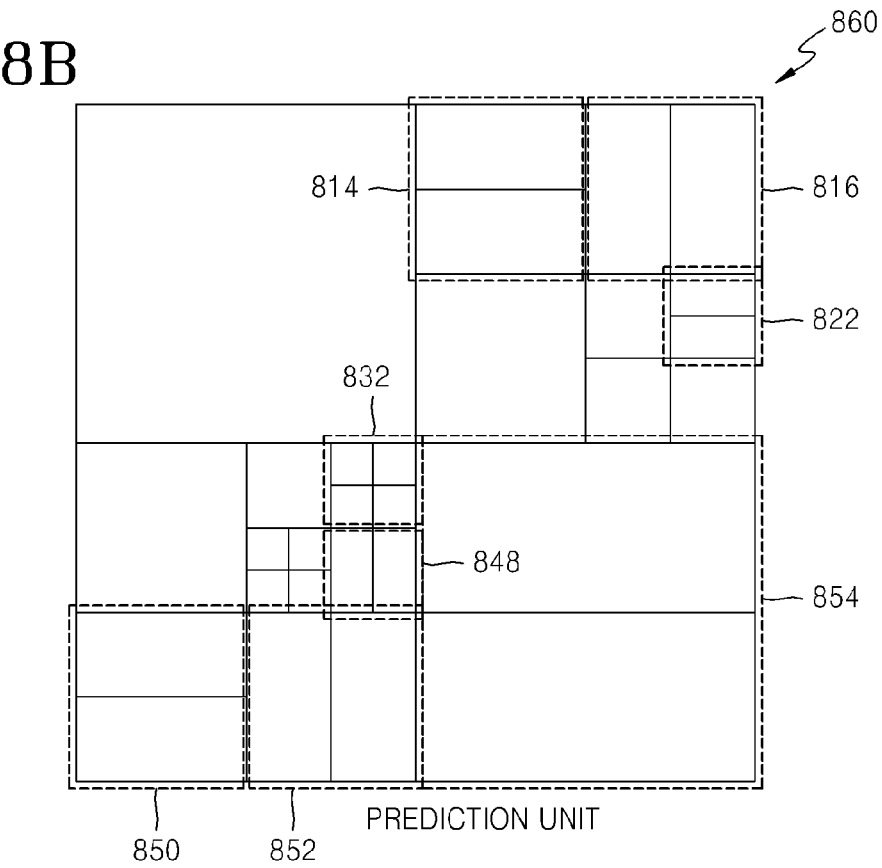

FIGS. 8A and 8B illustrate a coding unit and a prediction unit, according to an exemplary embodiment.

FIG. 8A shows a division shape selected by the image encoding apparatus 100 illustrated in FIG. 1, to encode a maximum coding unit 810. The image encoding apparatus 100 divides the maximum coding unit 810 into various shapes, performs encoding, and selects an optimal division shape by comparing encoding results of various division shapes with each other based on the RD costs. When it is optimal that the maximum coding unit 810 to be encoded as it is, the maximum coding unit 810 may be encoded without dividing the maximum coding unit 810 as illustrated in FIGS. 8A through 8D.

Referring to FIG. 8A, the maximum coding unit 810 whose depth is 0 is encoded by dividing it into sub coding units whose depths are equal to or greater than 1. That is, the maximum coding unit 810 is divided into 4 sub coding units whose depths are 1, and all or some of the sub coding units whose depths are 1 are divided into sub coding units 814, 816, 818, 828, 850, and 852 whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units 820, 822, 824, 826, 830, 832, 840, 842, 844, 846, and 848 whose depths are equal to or greater than 3.

FIG. 8B shows a division shape of a prediction unit for the maximum coding unit 810.

Referring to FIG. 8B, a prediction unit 860 for the maximum coding unit 810 may be divided differently from the maximum coding unit 810. In other words, a prediction unit for each of sub coding units may be smaller than a corresponding sub coding unit.

For example, a prediction unit for a sub coding unit 854 located in a lower-right side among the sub coding units 812, 854 whose depths are 1 may be smaller than the sub coding unit 854. In addition, prediction units for sub coding units 814, 816, 850, and 852 of sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

Figure 8C:
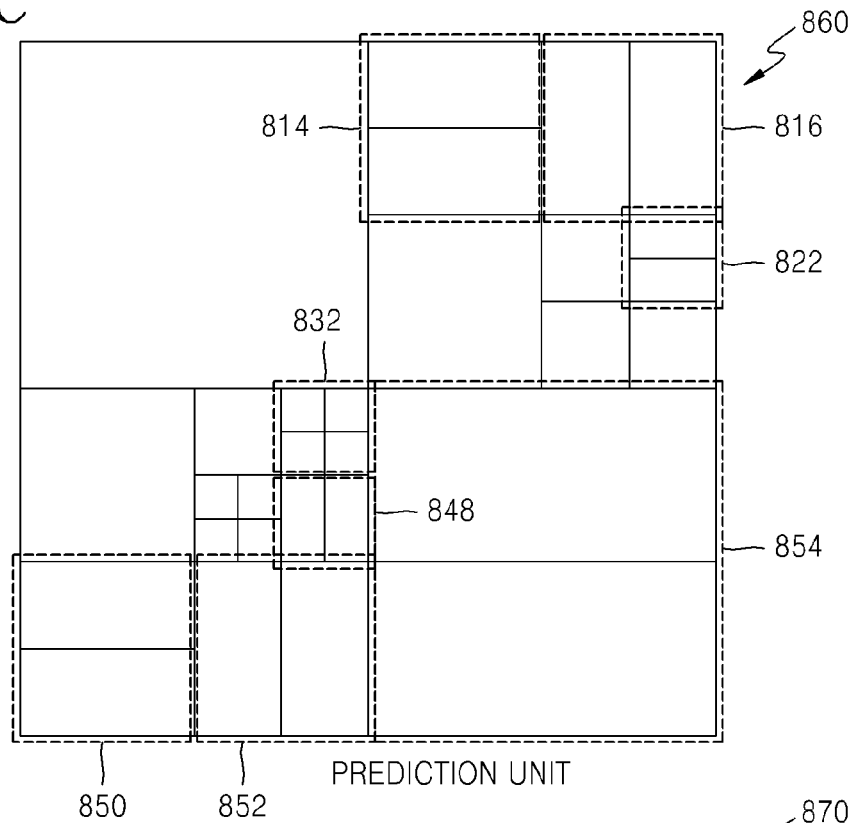
Figure 8D:
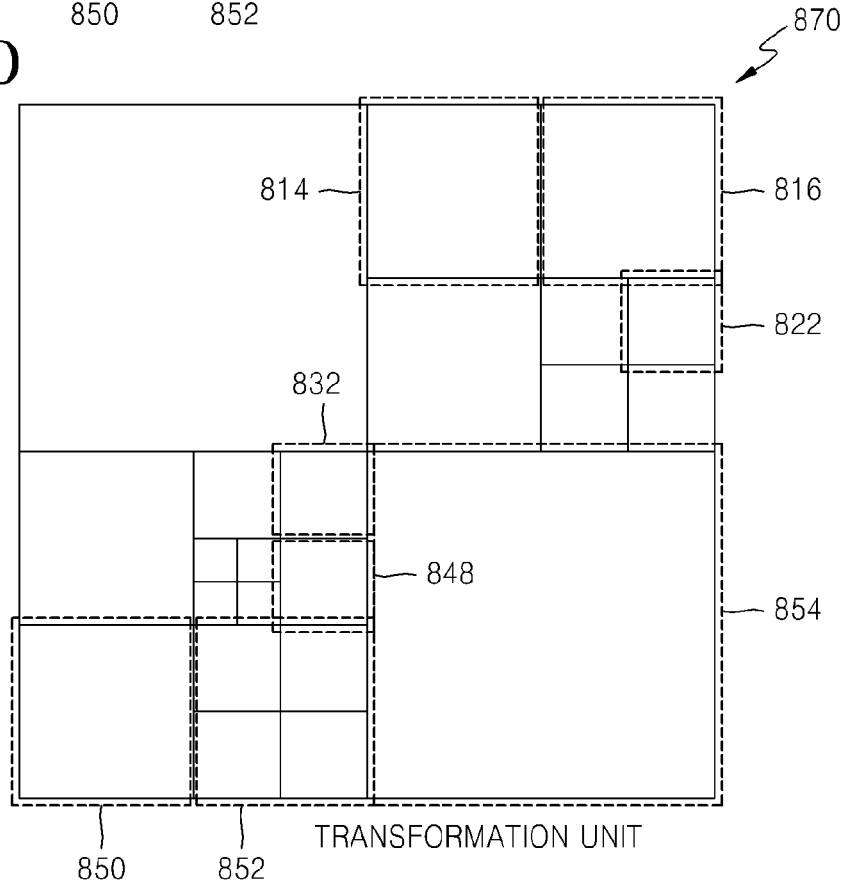

FIGS. 8C and 8D illustrate a prediction unit and a transform unit, according to an exemplary embodiment.

FIG. 8C shows a division shape of a prediction unit for the maximum coding unit 810 shown in FIG. 8B, and FIG. 8D shows a division shape of a transform unit of the maximum coding unit 810.

Referring to FIG. 8D, a division shape of a transformation unit 870 may be set differently from the prediction unit 860.

For example, even though a prediction unit for the sub coding unit 854 whose depth is 1 is selected with a shape whereby the height of the sub coding unit 854 is equally divided by two, a transform unit may be selected with the original size of the sub coding unit 854. Likewise, even though prediction units for sub coding units 814 and 850 whose depths are 2 are selected with a shape whereby the height of each of the sub coding units 814 and 850 is equally divided by two, a transform unit may be selected with the same size as the original size of each of the sub coding units 814 and 850.

A transform unit may be selected with a smaller size than a prediction unit. For example, when a prediction unit for the sub coding unit 852 whose depth is 2 is selected with a shape whereby the width of the sub coding unit 852 is equally divided by two, a transform unit may be selected with a shape whereby the sub coding unit 852 is equally divided by four in directions of height and width, which has a smaller size than the shape of the prediction unit.

Figure 9:
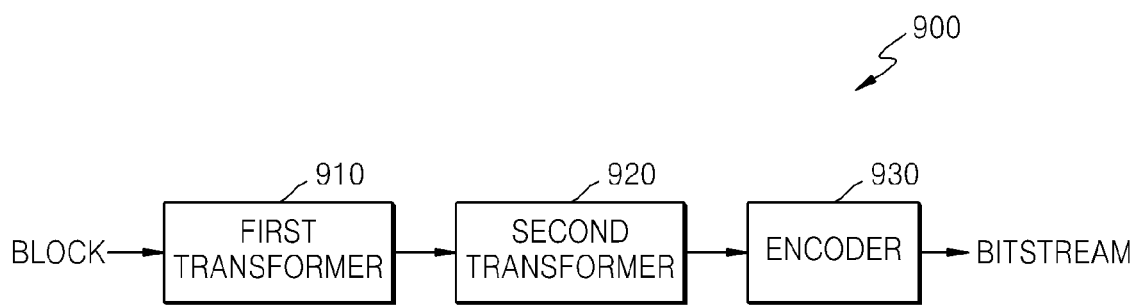
FIG. 9 is a block diagram of an apparatus for encoding an image, according to another exemplary embodiment.

FIG. 9 is a block diagram of an image encoding apparatus 900 for encoding an image, according to another exemplary embodiment.

The image encoding apparatus 900 illustrated in FIG. 9 may be a module, which is included in the image encoding apparatus 100 illustrated in FIG. 1 or the image encoder 400 illustrated in FIG. 4, for performing the following image encoding processes. Referring to FIG. 9, the image encoding apparatus 900 includes a first transformer 910, a second transformer 920, and an encoder 930.

The first transformer 910 generates a first frequency coefficient matrix by receiving and transforming a predetermined block to a frequency domain. The transform to the frequency domain may be DCT, and the received predetermined block may be a residual block. Also, a block that is input for encoding may be a transform unit as described above in relation to FIG. 7 or FIG. 8D. As a result of transform, the received block of a pixel domain is transformed into the coefficients of the frequency domain. A DCT coefficient matrix is generated by performing DCT on the block of the pixel domain.

The second transformer 920 performs post-processing to partially switch at least one of rows or columns of the DCT coefficient matrix according to whether the coefficients of the frequency domain are greater than a predetermined absolute value. The operation of the second transformer 920 is described in detail below with reference to FIGS. 10, and 11A through 11C.

Figure 10:
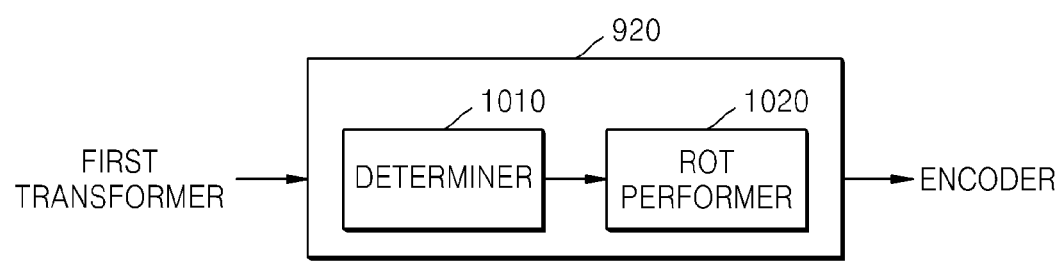
FIG. 10 is a block diagram of a second transformer illustrated in FIG. 9, according to an exemplary embodiment.

FIG. 10 is a block diagram of the second transformer 920 illustrated in FIG. 9, according to an exemplary embodiment.

Referring to FIG. 10, the second transformer 920 includes a determiner 1010 and a rotational transform (ROT) performer 1020.

The determiner 1010 determines whether the first frequency coefficient matrix generated by the first transformer 910 includes coefficients whose absolute values are greater than a predetermined value. The determiner 1010 may determine whether the first frequency coefficient matrix includes coefficients whose absolute values are greater than 0. In other words, the determiner 1010 determines whether the first frequency coefficient matrix includes non-zero coefficients.

If the first frequency coefficient matrix includes only coefficients of 0, ROT for partially switching at least one of the rows or columns of the first frequency coefficient matrix is not performed. Accordingly, the determiner 1010 determines whether the first frequency coefficient matrix includes non-zero coefficients. If prediction is accurately performed and thus all pixel values of a residual block are 0, the first frequency coefficient matrix includes only coefficients of 0.

The determiner 1010 may further determine whether the first frequency coefficient matrix is a matrix of a block of a bi-directionally predicted slice (B slice). It is experimentally verified that the first frequency coefficient matrix of a block of a B slice does not greatly improve in terms of a compression ratio even after ROT is performed. Accordingly, the determiner 1010 may determine whether the first frequency coefficient matrix is a matrix of a block of a B slice to perform ROT only when the predetermined block that is input for encoding to the image encoding apparatus 900 is not a block of a B slice.

The determiner 1010 may further determine whether the first frequency coefficient matrix is a matrix of an intra-predicted block. It is experimentally verified that the first frequency coefficient matrix of an inter-predicted block does not greatly improve in terms of compression ratio even after ROT is performed. Accordingly, the determiner 1010 may determine whether the first frequency coefficient matrix is a matrix of an intra-predicted block to perform ROT, only when the predetermined block that is input for encoding to the image encoding apparatus 900 is an intra-predicted block.

The order of performing the determination of whether the first frequency coefficient matrix includes coefficients whose absolute values are greater than a predetermined value, the determination of whether the predetermined block that is input for encoding is a block of a B slice, and the determination of whether the predetermined block that is input for encoding is an intra-predicted block is not restrictive but arbitrary. Also, the determiner 1010 may perform one or two of the above determinations to determine whether to perform ROT.

The ROT performer 1020 generates a second frequency coefficient matrix by selectively performing ROT based on a determination result of the determiner 1010. ROT may be transform for partially switching at least one of the rows or the columns. ROT is described in detail below with reference to FIGS. 11A through 11C. ROT may be performed only when the first frequency coefficient matrix includes coefficients whose absolute values are greater than a predetermined value or zero. Otherwise, ROT is not performed and the first frequency coefficient matrix is encoded as it is. Alternatively, as described above, ROT may be selectively performed on the first frequency coefficient matrix based on the determination of whether a block that is input for encoding is a block of a B slice and/or the determination of whether the block is an intra-predicted block.

Figure 11A:
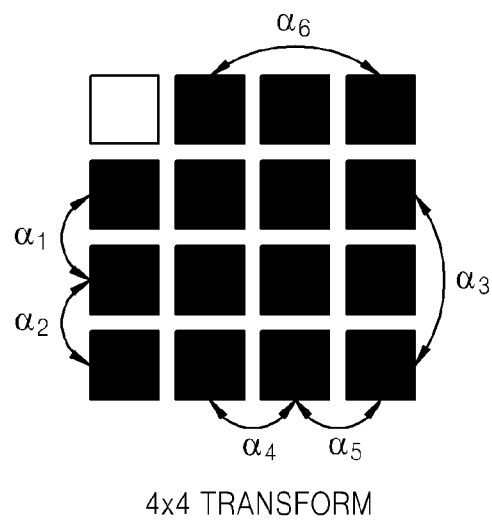
FIGS. 11A, 11B, and 11C are diagrams for describing rotational transform (ROT) according to an exemplary embodiment.
Figure 11B:
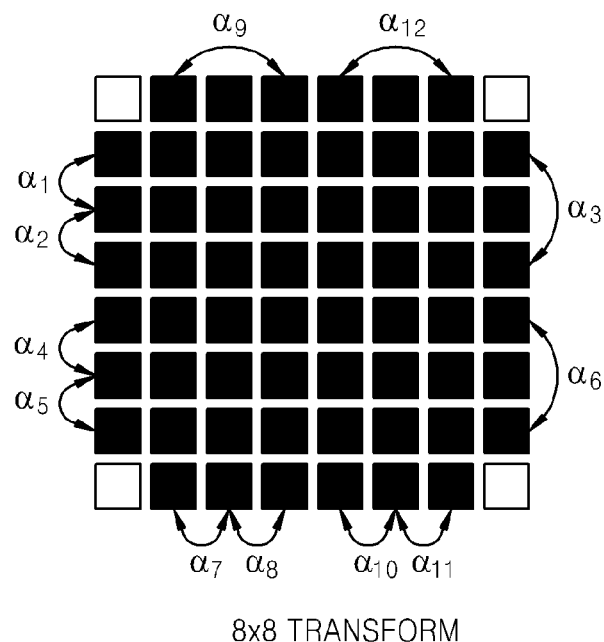
Figure 11C:
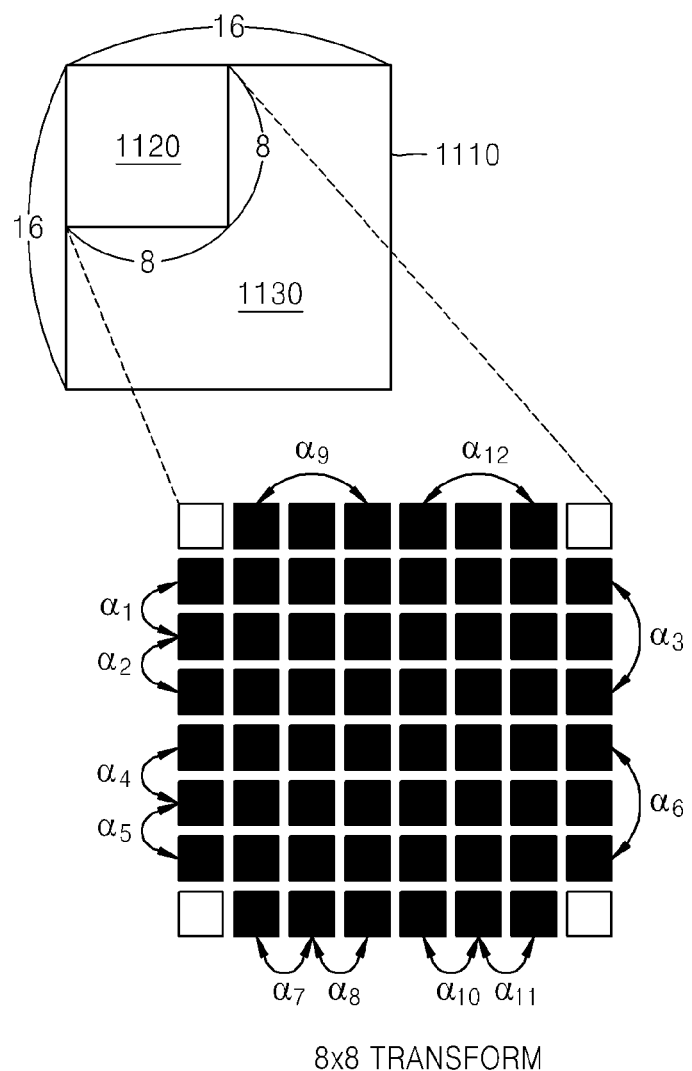

FIGS. 11A through 11C are diagrams for describing ROT according to an exemplary embodiment.

The ROT performer 1020 illustrated in FIG. 10 selectively partially switches at least one of the rows or the columns of the first frequency coefficient matrix based on a determination result of the determiner 1010. The switching of the rows and the columns of the first frequency coefficient matrix is described with reference to FIGS. 11A through 11C.

In an exemplary embodiment, partial switching of the rows or the columns involves partially switching values of two rows or two columns by using a function such as a sinusoidal function instead of unconditionally switching values of two rows or two columns in one to one correspondence.

For example, switching of two rows A and B may be defined according to the value of a parameter α as represented in Equation 1.

$$\text{Row } A(\text{new}) = \cos(a) \times \text{row } A(\text{old}) - \sin(a) \times \text{row } B(\text{old})$$

$$\text{Row } B(\text{new}) = \sin(a) \times \text{row } A(\text{old}) + \cos(a) \times \text{row } B(\text{old}) \quad \text{[Equation 1]}$$

Referring to Equation 1, the parameter α functions as an angle. Accordingly, in an exemplary embodiment, a parameter indicating a degree of partial switching between the rows or the columns of a DCT matrix is defined as an angle parameter.

If the value of the parameter α is 0°, energy switching is not performed. If the value of the parameter α is 90°, an entire energy exchange occurs between rows.

Also, if the value of the parameter α is greater than 90° and is less than 180°, an energy exchange occurs between rows and signs of element values are changed. If the value of the parameter α is 180°, an energy exchange does not occur between rows but signs of elements included in the rows are changed. In an exemplary embodiment, partial switching between the columns is performed in the same manner as the partial switching between the rows.

FIG. 11A illustrates a case in which a ROT is performed on a 4×4 frequency coefficient matrix. Referring to FIG. 11A, three parameters $\alpha_1$, $\alpha_2$, $\alpha_3$ are used in a partial switch between the rows of a frequency coefficient matrix, and three parameters $\alpha_4$, $\alpha_5$, $\alpha_6$ are used in a partial switch between the columns.

FIG. 11B illustrates a case in which a ROT is performed on an 8×8 frequency coefficient matrix. In the case of FIG. 11B, $\alpha_1$, $\alpha_2$, $\alpha_3$, $\alpha_4$, $\alpha_5$, $\alpha_6$ are used in a partial switch between the rows, and $\alpha_7$, $\alpha_8$, $\alpha_9$, $\alpha_{10}$, $\alpha_{11}$, $\alpha_{12}$ are used in a partial switch between the columns.

FIG. 11C illustrates a case in which a ROT is performed on a frequency coefficient matrix having a size equal to or greater than 16×16.

As described above in relation to FIGS. 11A and 11B, as a size of a frequency coefficient matrix is increased, the number of angle parameters is increased. To perform the ROT on the 4×4 frequency coefficient matrix of FIG. 11A, six angle parameters are used, and to perform the ROT on the 8×8 frequency coefficient matrix of FIG. 11B, twelve angle parameters are used.

Although a compression rate is improved in a manner that an adjusted frequency coefficient matrix is generated by performing the ROT on the frequency coefficient matrix, and then quantization and entropy encoding are performed on the adjusted frequency coefficient matrix, if the number of angle parameters is increased so that an overhead is increased, a total amount of data is not decreased. Thus, when the ROT is performed on a frequency coefficient matrix having a size equal to or greater than 16×16, a predetermined size matrix for a coefficient sampling is used.

In other words, as illustrated in FIG. 11C, the ROT performer 1020 selects a sampled frequency coefficient matrix 1120 including only some of the coefficients of a frequency coefficient matrix 1110, and then performs the ROT on the selected frequency coefficient matrix 1120. The ROT is not performed on the remaining unselected portion 1130 of the frequency coefficient matrix 1110.

In order to achieve a sufficient effect of the ROT on a frequency coefficient matrix having a large size, the coefficients included in the frequency coefficient matrix 1120 should have an effect on compression of image data. Thus, the ROT performer 1020 only selects coefficients that have a low frequency component and that may have a value other than 0, and performs the ROT on the coefficients.

In general, a frequency coefficient matrix that is generated as a result of a transform includes coefficients with respect to a low frequency component at an upper left corner of the frequency coefficient matrix. Thus, as illustrated in FIG. 11C, the ROT performer 1020 selects only coefficients positioned at an upper left corner of the frequency coefficient matrix 1110, and then performs the ROT. In an example of FIG. 11C, the ROT performer 1020 performs the ROT on the frequency coefficient matrix 1120 having a size of 8×8 in the same manner as the ROT in relation to FIG. 11B.

Referring to the ROT on the 4×4 frequency coefficient matrix of FIG. 11A, different results are obtained according to an application order of three angle parameters $\alpha_1$, $\alpha_2$, $\alpha_3$. That is, the three angle parameters are not independent from each other. An adjusted frequency coefficient matrix that is generated as a result of performing the ROT on a case in which the angle parameter $\alpha_1$ is first applied and then the angle parameter $\alpha_2$ is applied is different from an adjusted frequency coefficient matrix that is generated as a result of performing the ROT on a case in which the angle parameter $\alpha_2$ is first applied and then the angle parameter $\alpha_1$ is applied. This is described in detail below with reference to FIG. 12.

Figure 12:
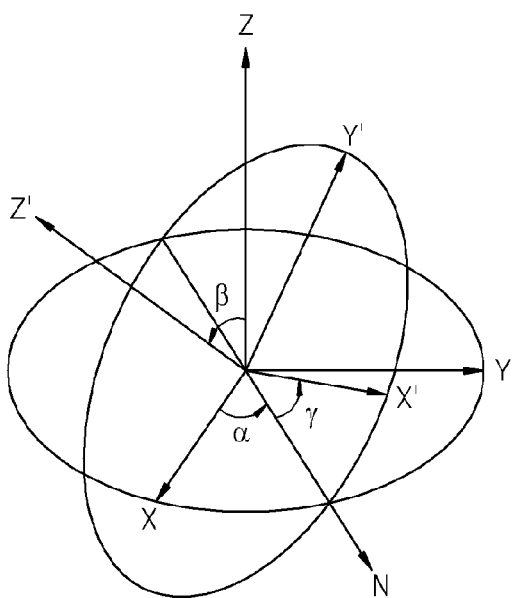
FIG. 12 illustrates Euler angles according to an exemplary embodiment.

FIG. 12 is a diagram of Euler angles according to another exemplary embodiment.

Referring to FIG. 12, a switch between the rows or between the columns of a matrix is similar to rotation of coordinate axes in a three-dimensional (3D) space. That is, three rows or columns correspond to X, Y, and Z axes of the 3D coordinates, respectively. With respect to the rotation of the coordinate axes in the 3D space, different results are obtained according to which axis rotates first.

In FIG. 12, $\alpha$, $\beta$, $\gamma$ angles indicate the Euler angles, X, Y, and Z axes indicate coordinate axes before the rotation, and X', Y', and Z' axes indicate coordinate axes after the rotation. An N-axis is an intersection between an X-Y plane and an X'-Y' plane. Here, the N-axis is referred to as line of nodes.

The angle $\alpha$ indicates an angle between the X-axis and the N-axis which rotate around Z-axis. The angle $\beta$ indicates an angle between the Z-axis and the Z'-axis which rotate around the N-axis. The angle $\gamma$ indicates an angle between the N-axis and the X'-axis which rotate around the Z'-axis.

The rotation of the coordinate axes according to the Euler angles is given by Equation 2.

$$\begin{pmatrix} \cos\gamma & \sin\gamma & 0 \\ -\sin\gamma & \cos\gamma & 0 \\ 0 & 0 & 1 \end{pmatrix} \begin{pmatrix} 1 & 0 & 0 \\ 0 & \cos\beta & \sin\beta \\ 0 & -\sin\beta & \cos\beta \end{pmatrix} \begin{pmatrix} \cos\alpha & \sin\alpha & 0 \\ -\sin\alpha & \cos\alpha & 0 \\ 0 & 0 & 1 \end{pmatrix} \quad \text{[Equation 2]}$$

A first matrix indicates rotation around the Z'-axis. A second matrix indicates rotation around the N-axis. A third matrix indicates rotation around the Z-axis.

In one or more exemplary embodiments, the switch between the rows or between the columns of the matrix may be indicated as rotation of coordinates axes using the Euler angles.

Referring back to FIGS. 9 and 10, the second frequency coefficient matrix generated when the ROT performer 1020 of the second transformer 920 performs ROT on the first frequency coefficient matrix is input to the encoder 930.

The encoder 930 encodes the second frequency coefficient matrix generated by selectively performing ROT based on the determination result of the determiner 1010.

If the second frequency coefficient matrix is generated by performing ROT on the first frequency coefficient matrix based on the determination result of the determiner 1010, coefficients included in the second frequency coefficient matrix are quantized according to a predetermined quantization step and the quantized second frequency coefficient matrix is entropy-encoded. Entropy encoding is performed according to a context-adaptive binary arithmetic coding (CABAC) method or a context-adaptive variable length coding (CAVLC) method. If the first frequency coefficient matrix has a large size and thus ROT is performed on the selected matrix 1120 including only some sampled coefficients, the entire first frequency coefficient matrix 1110 including the selected matrix 1120 on which ROT is performed and the remaining portion 1130 on which ROT is not performed may be quantized and entropy-encoded.

The encoder 930 may encode information indicating that the first frequency coefficient matrix includes coefficients whose absolute values are greater than a predetermined value. For example, the encoder 930 may encode flag information indicating that the first frequency coefficient matrix includes non-zero coefficients.

Also, the encoder 930 also entropy-encodes angle parameters used when the second transformer 920 performs ROT. The image encoding apparatus 900 determines optimal angle parameters used to perform ROT as described below.

In order to efficiently perform compression, the optimal angle parameters need to be determined. However, this is a multi-parameter problem having strongly non-smooth dependence on parameter. In order to solve this problem, a Monte Carlo method is used. Here, a Lehmer's random sequence number may be used to generate a random point in the Monte Carlo method. Instead of storing or transmitting an angle parameter used as a parameter, only one integer indicating a sequence number may be stored or transmitted. Thus, it is possible to decrease an overhead that is necessary to inform a decoder of an angle parameter used in the ROT.

That is, matters to be considered to determine combination of the optimal angle parameters are:

Reversible transform of a transform matrix;

Rearrangement of an energy for more efficient coding; and

Minimization of information added by using the Lehmer's random sequence number.

Referring back to FIGS. 11A through 11C, matrix parts that are revised by rotation of the frequency coefficient matrix are colored black, and matrix parts that are not revised are colored white. In the 4×4 frequency coefficient matrix of FIG. 11A, six angle parameters are involved in revision of fifteen coefficients according to a switch between rows and between columns. In the 8×8 frequency coefficient matrix of FIG. 11B, twelve angle parameters are involved in revision of sixty coefficients.

Referring to FIG. 11A, for the switch between the rows, three angle parameters are used, and for the switch between the columns, three angle parameters are further used. Thus, with respect to a 4×4 block, six angle parameters are used.

Referring to FIG. 11B, for the switch between the rows, six angle parameters are used, and for the switch between the columns, six angle parameters are further used. Thus, with respect to a 8×8 block, twelve angle parameters are used.

The image encoding apparatus 900 may perform the ROT according to following steps:

Step 1—Orthogonal transform family parameterization

Step 2—Monte Carlo method

Step 3—Lehmer's pseudo-random numbers

Step 4—Localization of diapason for optimal angle parameters

Step 5—Quasi-optimal basis

Although a compression rate of an image is improved by using the ROT, if too many parameters are added, transmission of a video signal may achieve a better result than compression. In other words, there is a trade-off between the compression ratio and the overhead of additional parameters. For example, although an image signal in a 4×4 frequency coefficient matrix is compressed to a size near 0, if the compression requires sixteen additional parameters, it may not be optimal to perform the ROT. In this regard, it may be more efficient to transmit sixteen pixel values to a decoder. Thus, both of compression of an image signal, and minimization of an added overhead are to be taken into consideration.

Accordingly, the ROT performer 1020 searches for an optimal angle parameter while minimizing an overhead according to following steps.

Step 1—Orthogonal Transform Family Parameterization

In order to choose the optimal transform for current data, basis adjustment is sought. The rotation of basis is chosen as basis modification, so that the set of rotational angles describes basis modification uniquely.

Introduced rotational angles describe basis modification in a similar way as Euler's angles describe the rotation of solid body in 3D space.

In order to revise the basis, rotation of the basis is selected. In one or more exemplary embodiments, the rotation of the basis is performed by using an angle parameter. Here, the rotation of the basis, which is performed by using the angle parameter, is used. The angle parameter may be the Euler angle. However, the angle parameter is not limited to the Euler angle, and thus may include others that may indicate a level of a partial switch of one or more values between rows and between columns of a matrix. Hereinafter, an example involving using the Euler angle is described.

The rotation is defined by Equation 3 by using a left multiplication $R_{horizontal}$ and a right multiplication $R_{vertical}$ of a frequency coefficient matrix D.

$$D' = R_{horizontal} \times D \times R_{vertical} \qquad \text{[Equation 3]}$$

(D' indicates an adjusted frequency coefficient matrix that is rotationally transformed.)

The matrix $R_{horizontal}$ performs a switch between rows of the frequency coefficient matrix D. The $R_{vertical}$ performs a switch between columns of the frequency coefficient matrix D.

An example of the matrix $R_{horizontal}$ in a 4×4 block is given by Equation 4.

$$Rhorizontal = \begin{pmatrix} A & B & C & 0 \\ D & E & F & 0 \\ G & H & I & 0 \\ 0 & 0 & 0 & 1 \end{pmatrix} \qquad \text{[Equation 4]}$$

$A = \cos^\alpha \cos^\gamma - \sin^\alpha \cos^\beta \sin^\gamma$,
$B = -\sin^\alpha \cos^\gamma - \cos^\alpha \cos^\beta \sin^\gamma$,
$C = \sin^\beta \sin^\gamma$,
$D = \cos^\alpha \sin^\gamma + \sin^\alpha \cos^\beta \cos^\gamma$,
$E = -\sin^\alpha \sin^\gamma + \cos^\alpha \cos^\beta \cos^\gamma$,
$F = -\sin^\beta \cos^\gamma$,
$G = \sin^\alpha \sin^\beta$,
$H = \cos^\alpha \sin^\beta$,
$I = \cos^\beta$ In Equation 4, $\alpha$, $\beta$, $\gamma$ indicate the Euler angles.

Thus, with respect to a 4×4 frequency coefficient matrix, the Euler angles describe adjustment of fifteen frequency coefficients by a group of six parameters of $\alpha_1, \alpha_2, \ldots, \alpha_6$. With respect to a 8×8 frequency coefficient matrix, twelve Euler angles of $\alpha_1, \alpha_2, \ldots, \alpha_{12}$ describe revision of sixty frequency coefficients.

Step 2—Monte Carlo Method

After a degree of freedom is decreased to six angle parameters (twelve angle parameters in the case of the 8×8 frequency coefficient matrix), an optimization matter is checked in consideration of saving bits. That is, a method of selecting a group of angle parameters is optimized as discussed below.

The optimization has a difficulty in that a high-dimensional domain of a parameter (six or twelve angle parameters) is used, and the compression of an image is non-smoothly dependent on used parameters. In general, the difficulty is solved by using the Monte Carlo method.

The core of the Monte Carlo method is to perform a plurality of attempts. That is, a compression rate is measured from several points, and then a best point therefrom is selected. In the Monte Carlo method, a quality of a random point in a multi-dimensional domain is highly important (in particular, the quality is more important according to elevation of a dimension). The preference of pseudo-random points over uniform grid points for this application is well-known. This is described in FIG. 13 with reference to 2D case.

Figure 13:
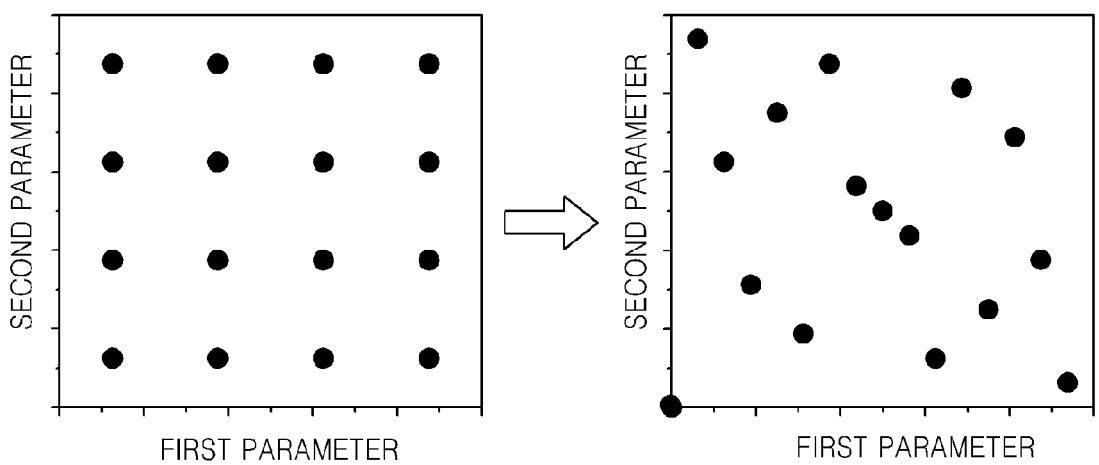
FIG. 13 illustrates pseudo-random points according to an exemplary embodiment.

FIG. 13 illustrates pseudo-random points according to another exemplary embodiment.

A left diagram of FIG. 13 illustrates first sixteen uniform grid points, and a right diagram of FIG. 13 illustrates first sixteen pseudo-random points.

In a case where the uniform grid points are used, in spite of sixteen points of the Monte Carlo method, only four different values are checked with respect to a first parameter (and a second parameter). On the other hand, in a case where the pseudo-random points are used, sixteen different values are checked with respect to a first parameter (and a second parameter) by sixteen points. That is, when the pseudo-random points are used, various values of the first and second parameters are sufficiently checked with respect to sixteen points. In particular, with respect to the Monte Carlo method, the use of the pseudo-random points is more advantageous than the use of the uniform grid points, according to an increase of the number of parameters.

Step 3—Lehmer's Pseudo-random Numbers

A pseudo-random sequence may be generated by using various methods. One of the most efficient methods is to use a Lehmer number. This is an artificially generated sequence which has properties very close to uniformly distributed random numbers. An algorithm for generating a Lehmer sequence is well known, and thus a detailed description thereof is omitted here. According to an exemplary embodiment, at least 1013 unrepeated points are provided. The Lehmer sequence is an artificially generated sequence, and the algorithm for generating the Lehmer sequence is well known, so that a decoder may easily recalculate it.

By using the Lehmer sequence, a combination of angle parameters may be coded by using one integer number (that is, a number in a random sequence). In a six-dimensional (in the case of a 4×4 frequency coefficient matrix) or twelve-dimensional (in the case of an 8×8 frequency coefficient matrix) parameter domain, random points corresponding to the combination of the angle parameters are generated, a compression rate is measured after compression is performed by using the random points, and then an optimal parameter point is selected. Instead of storing or transmitting the combination of the angle parameters, an index number of the Lehmer sequence corresponding to the optimal parameter point is stored or transmitted.

If 2p points are examined in the Monte Carlo method, only p bits of information are included as an overhead.

Step 4—Localization of Diapason for Optimal Angle Parameters

According to one or more exemplary embodiments, an optimal rotation angle has a value near 0 degrees or 180 degrees (π radian). This means that a basis for a transform to a frequency domain, such as, for example, a DCT basis or a KLT basis, is substantially optimized.

Thus, angle parameters according to one or more exemplary embodiments are only used to perform a partial switch (an angle near 0 degrees in the case of the Euler angles) of one or more values between rows and between columns, or to perform the partial switch, and a change (an angle near 180 degrees in the case of the Euler angles) of a sign of a basis element. That is, a diapason of parameters used in one or more exemplary embodiments may be limited to a specific part of a domain, and this limitation is referred to as localization.

By performing the localization on the diapason of the parameters, the number of bits with respect to an overhead is decreased. If it is assumed that points to be checked are limited to a specific part in FIG. 13, the number of points to be checked to search for optimal combination of the angle parameters is decreased.

Also, if the number of points to be checked is fixed (that is, in a case where the number of bits used as overheads is fixed), and the localization is applied, more points in a smaller angle may be checked so that a compression rate may be increased.

Step 5—Quasi-Optimal Basis

By performing the aforementioned steps 1 through 4, it is possible to select an optimal basis with respect to all blocks (blocks having a size equal to or greater than 4×4 and 8×8). When a bit rate is decreased, it is preferred to select a quasi-optimal basis.

The quasi-optimal basis means that the same rotation is applied to a group of all transform units or some of the transform units included in a slice or a picture. If optimal rotation is applied to each block, a compression rate with respect to an image is increased but an overhead is also increased.

In order to determine which unit from among a transform unit, a group of transform units, a slice, and a picture is applied the same rotation, various experiments may be performed.

After a transform to a frequency domain at a low bit rate, a quantization coefficient value in many parts of a frequency coefficient matrix becomes 0. Thus, with respect to the parts of the frequency coefficient matrix, it is not necessary to perform the ROT and to transmit additional information regarding a rotation angle value.

The image encoding apparatus 900 performs the ROT on a combination of a plurality of angle parameters by using the Monte Carlo method, and repeatedly performs quantization and entropy encoding, thereby determining optimal combination of the angle parameters. Also, the image encoding apparatus 900 does not encode the angle parameters but encodes a Lehmer's pseudo-random sequence number as the information regarding the determined optimal combination of the angle parameters. Here, by using the localization and the quasi-optimal basis, the information regarding the angle parameters may be encoded at a higher efficiency.

Referring back to FIGS. 9 and 10, if the second transformer 920 does not generate the second frequency coefficient matrix by performing ROT on the first frequency coefficient matrix based on the determination result of the determiner 1010, the encoder 930 encodes the first frequency coefficient matrix, on which ROT is not performed, as it is.

Also, if the first frequency coefficient matrix includes only coefficients of 0, the first frequency coefficient matrix does not need to be encoded and only information, for example, the flag information, indicating that the first frequency coefficient matrix of an input predetermined block includes only coefficients of 0 is encoded.

Figure 14:
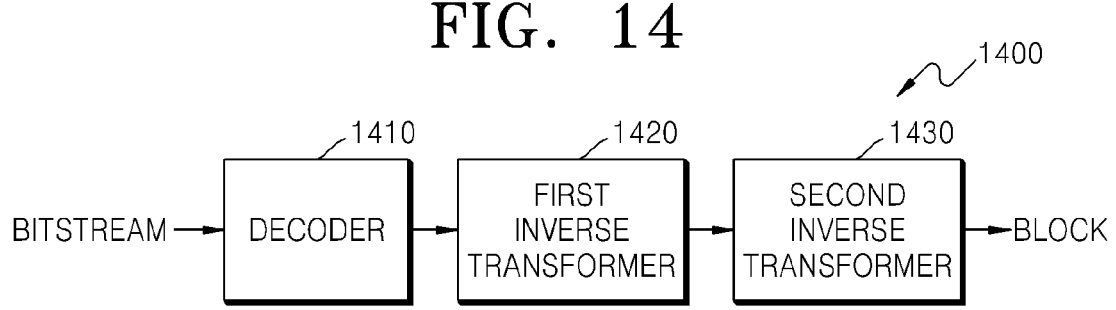
FIG. 14 is a block diagram of an apparatus for decoding an image, according to another exemplary embodiment.

FIG. 14 is a block diagram of an image decoding apparatus 1400 for decoding an image, according to another exemplary embodiment.

The image decoding apparatus 1400 illustrated in FIG. 14 may be a module, which is included in the image decoding apparatus 200 illustrated in FIG. 2 or the image decoder 500 illustrated in FIG. 5, for performing the image decoding processes. Referring to FIG. 14, the image decoding apparatus 1400 includes a decoder 1410, a first inverse transformer 1420, and a second inverse transformer 1430.

The decoder 1410 receives a bitstream and decodes information indicating whether a first frequency coefficient matrix generated by transforming a predetermined block to a frequency domain includes coefficients whose absolute values are greater than a predetermined value. For example, the decoder 1410 may decode flag information indicating whether the first frequency coefficient matrix includes non-zero coefficients.

After that, the decoder 1410 selectively decodes data of a second frequency coefficient matrix based on the decoded information. The second frequency coefficient matrix is a matrix generated by performing ROT on the first frequency coefficient matrix. The operation of the decoder 1410 is described in detail with reference to FIG. 15.

Figure 15:
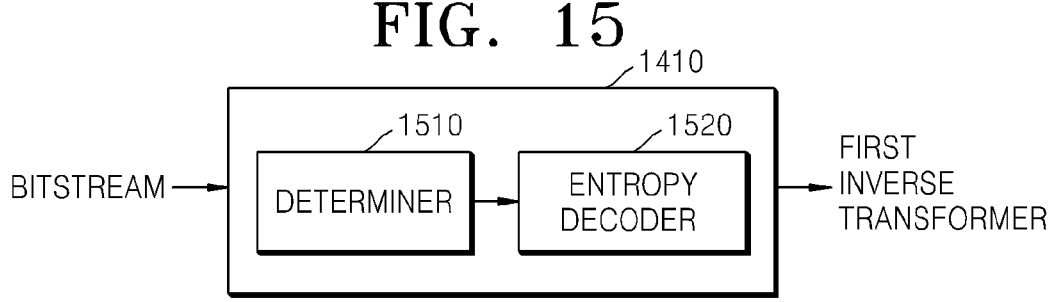
FIG. 15 is a block diagram of a decoder illustrated in FIG. 14, according to an exemplary embodiment.

FIG. 15 is a block diagram of the decoder 1410 illustrated in FIG. 14, according to an exemplary embodiment.

Referring to FIG. 15, the decoder 1410 includes a determiner 1510 and an entropy decoder 1520.

The determiner 1510 determines whether to decode the second frequency coefficient matrix based on the decoded information, such as, for example, the information indicating whether the first frequency coefficient matrix includes coefficients whose absolute values are greater than a predetermined value. The determiner 1510 determines whether to decode the second frequency coefficient matrix based on flag information indicating whether the first frequency coefficient matrix includes non-zero coefficients.

As described above in relation to FIG. 10, if the first frequency coefficient matrix includes only frequency domain coefficients of 0, ROT is not performed on the first frequency coefficient matrix in an encoding process. Accordingly, the data of the second frequency coefficient matrix is not included in the bitstream. In this case, the decoder 1410 does not need to decode the data of the second frequency coefficient matrix.

However, if the first frequency coefficient matrix includes coefficients greater than 0, the data of the second frequency coefficient matrix generated by performing ROT on the first frequency coefficient matrix is included in the bitstream and thus the decoder 1410 has to decode the data of the second frequency coefficient matrix.

The entropy decoder 1520 selectively entropy-decodes the data of the second frequency coefficient matrix based on a determination result of the determiner 1510. If the first frequency coefficient matrix includes coefficients whose absolute values are greater than a predetermined value and thus ROT is performed on the first frequency coefficient matrix, the data of the second frequency coefficient matrix is included in the bitstream. The entropy decoder 1520 entropy-decodes the data of the second frequency coefficient matrix, which is included in the bitstream. Like entropy encoding, entropy decoding may be performed according to a CABAC method or a CAVLC method. Also, to perform inverse ROT, the entropy decoder 1520 may decode information about angle parameters used to perform ROT.

The second frequency coefficient matrix entropy-decoded by the entropy decoder 1520 is inverse-quantized according to a predetermined quantization step performed in an encoding process.

Referring back to FIG. 14, the first inverse transformer 1420 generates the first frequency coefficient matrix by performing inverse ROT on the second frequency coefficient matrix inverse-quantized by the decoder 1410.

The first inverse transformer 1420 generates the first frequency coefficient matrix by performing inverse ROT on the second frequency coefficient matrix if the first frequency coefficient matrix includes non-zero coefficients and thus the decoder 1410 decodes the data of the second frequency coefficient matrix.

Also, as described above in relation to FIG. 10, only when the first frequency coefficient matrix is not a matrix of a block of a B slice or is a matrix of an intra-predicted block, the first inverse transformer 1420 generates the first frequency coefficient matrix by performing inverse ROT on the second frequency coefficient matrix.

The first inverse transformer 1420 performs inverse ROT on the inverse-quantized second frequency coefficient matrix by inversely performing ROT described above in relation to FIGS. 11A through 11C, 12, and 13. In this case, inverse ROT may be performed with reference to information about angle parameters, which is entropy-decoded by the decoder 1410. The first frequency coefficient matrix is generated by partially switching at least one of the rows or the columns of the second frequency coefficient matrix according to the information about the angle parameters.

If ROT is performed on a matrix including only some sampled coefficients of the first frequency coefficient matrix in an encoding process, the first frequency coefficient matrix is generated by performing inverse ROT on the matrix including only some sampled coefficients.

The second inverse transformer 1430 receives the first frequency coefficient matrix from the first inverse transformer 1420 and performs inverse frequency transform on the received first frequency coefficient matrix. Inverse frequency transform may be performed on the first frequency coefficient matrix by inversely performing DCT. As a result of inverse frequency transform, a predetermined block of a pixel domain is restored.

Figure 16:
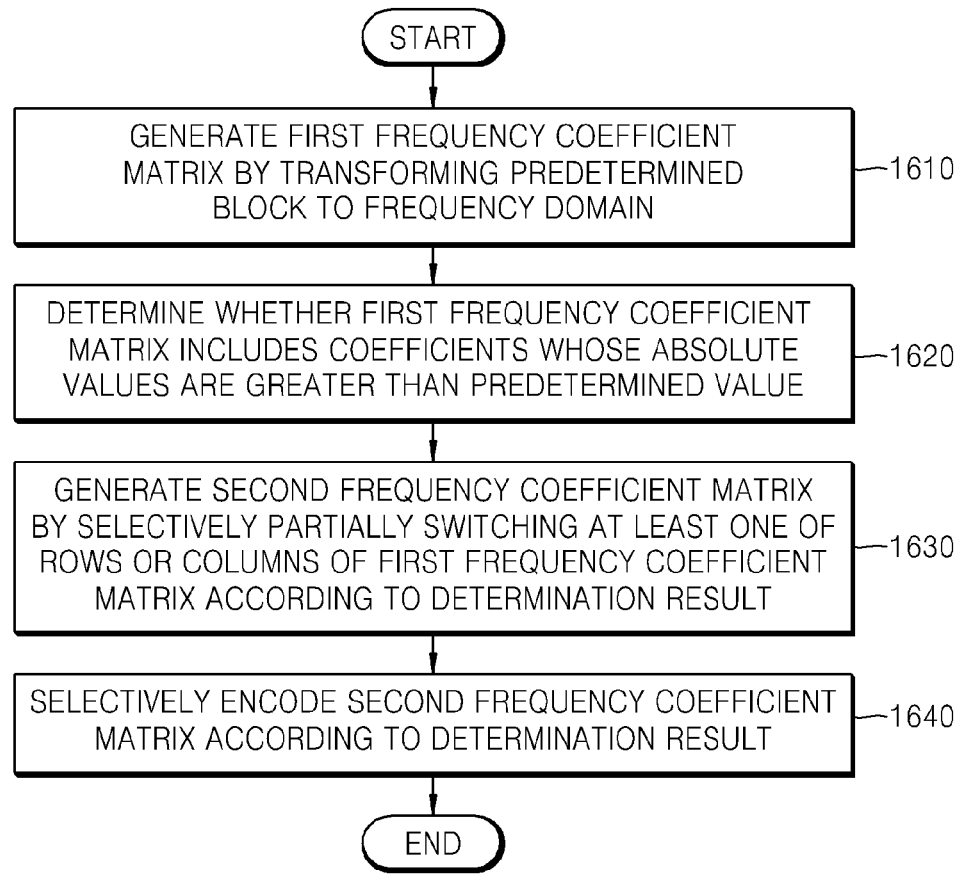
FIG. 16 is a flowchart of a method of encoding an image, according to an exemplary embodiment.

FIG. 16 is a flowchart of a method of encoding an image, according to an exemplary embodiment.

Referring to FIG. 16, in operation 1610, an image encoding apparatus generates a first frequency coefficient matrix by transforming a predetermined block to a frequency domain. The image encoding apparatus receives the predetermined block, performs DCT, and thus generates the first frequency coefficient matrix including DCT coefficients.

In operation 1620, the image encoding apparatus determines whether the first frequency coefficient matrix generated in operation 1610 includes coefficients whose absolute values are greater than a predetermined value. The image encoding apparatus may determine whether the first frequency coefficient matrix includes coefficients whose absolute values are greater than 0. Also, the image encoding apparatus may also determine whether a block that is input for encoding is a block of a B slice and whether the block is an intra-predicted block.

In operation 1630, the image encoding apparatus generates a second frequency coefficient matrix by selectively partially switching at least one of the rows or the columns of the first frequency coefficient matrix based on a determination result of operation 1620. The second frequency coefficient matrix is generated by performing ROT on the first frequency coefficient matrix as described above in relation to FIGS. 11A through 11C, 12, and 13.

If the first frequency coefficient matrix has a large size, for example, a size equal to or greater than 16×16, a matrix including only some sampled coefficients of the first frequency coefficient matrix may be selected and ROT may be performed on only the selected matrix. When the matrix including only some sampled coefficients is selected, a matrix including only coefficients of low-frequency components may be selected.

In operation 1640, the image encoding apparatus selectively encodes the second frequency coefficient matrix based on the determination result of operation 1620. If the second frequency coefficient matrix is generated in operation 1630 by performing ROT based on the determination result of operation 1620, the image encoding apparatus encodes the generated second frequency coefficient matrix.

The image encoding apparatus quantizes the second frequency coefficient matrix according to a predetermined quantization step, and entropy-encodes the quantized second frequency coefficient matrix. Entropy encoding is performed according to a CABAC method or a CAVLC method.

In operation 1640, the image encoding apparatus further entropy-encodes information about angle parameters used to partially switch at least one of the rows or the columns in operation 1630. The angle parameters are parameters indicating degrees of partial switching between at least one of the rows or the columns. Also, the image encoding apparatus may further encode information indicating whether the first frequency coefficient matrix includes coefficients whose absolute values are greater than a predetermined value. For example, the image encoding apparatus may encode flag information indicating whether the first frequency coefficient matrix includes non-zero coefficients.

The image encoding apparatus may repeatedly perform operations 1630 and 1640 for a combination of a plurality of angle parameters to determine an optimal angle parameter. The image encoding apparatus repeatedly encodes a combination of a plurality of angle parameters to select an angle parameter having the best compression ratio.

A combination of a plurality of angle parameters may be selected by using the above-mentioned Monte Carlo method and may correspond to a Lemer's pseudo-random number. When a combination of a plurality of angle parameters are made correspond to a Lemer's pseudo-random number, the information about the angle parameters, which is encoded in operation 1640, may be a number of a Lemer's pseudo-random sequence corresponding to the determined optimal angle parameter.

Figure 17:
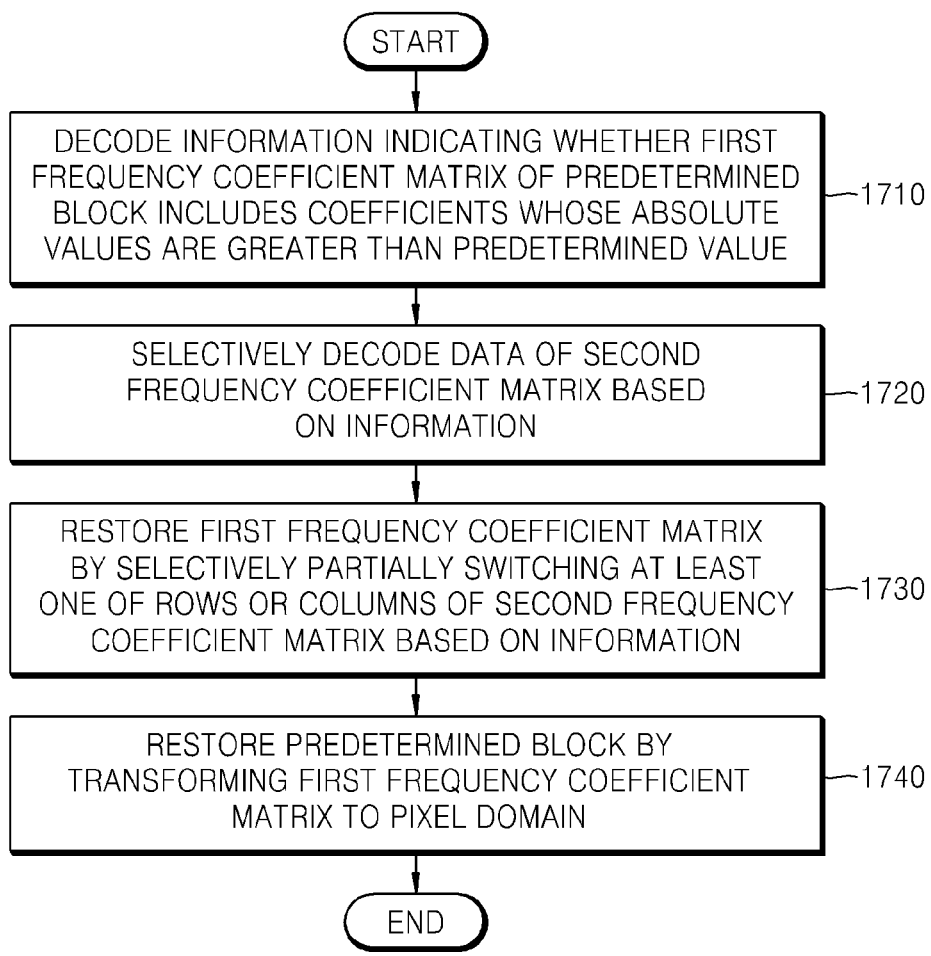
FIG. 17 is a flowchart of a method of decoding an image, according to an exemplary embodiment.

FIG. 17 is a flowchart of a method of decoding an image, according to an exemplary embodiment.

Referring to FIG. 17, in operation 1710, an image decoding apparatus receives a bitstream of a predetermined block and decodes information indicating whether a first frequency coefficient matrix of the predetermined block includes coefficients whose absolute values are greater than a predetermined value. The image decoding apparatus may decode flag information indicating whether the first frequency coefficient matrix includes coefficients greater than 0.

As described above in relation to FIG. 16, in an encoding process, only when the first frequency coefficient matrix includes non-zero coefficients, a second frequency coefficient matrix is generated by performing ROT on the first frequency coefficient matrix, and then is entropy-encoded. Accordingly, to determine whether to entropy-encode data of the second frequency coefficient matrix, the information indicating whether the first frequency coefficient matrix includes coefficients whose absolute values are greater than 0 is decoded first. The second frequency coefficient matrix is generated by performing ROT on the first frequency coefficient matrix.

In operation 1720, the image decoding apparatus decodes the second frequency coefficient matrix based on the information decoded in operation 1710. Based on the information decoded in operation 1710, only when the first frequency coefficient matrix includes coefficients whose absolute values are greater than a predetermined value, does the image decoding apparatus entropy-decode the data of the second frequency coefficient matrix and inverse-quantize coefficients of the entropy-decoded second frequency coefficient matrix. The coefficients of the second frequency coefficient matrix are inverse-quantized according to a quantization step used in an image encoding process.

In operation 1730, the image decoding apparatus generates the first frequency coefficient matrix by partially switching at least one of the rows or the columns of the second frequency coefficient matrix decoded in operation 1720. The image decoding apparatus generates the first frequency coefficient matrix by inversely performing ROT described above in relation to FIGS. 11A through 11C, 12, and 13, with reference to information about angle parameters, which is entropy-decoded in operation 1710.

As described above in relation to FIG. 14, if ROT is performed on a matrix including only some sampled coefficients of the first frequency coefficient matrix in an encoding process, the first frequency coefficient matrix is generated by performing inverse ROT on the matrix including only some sampled coefficients.

In operation 1740, the image decoding apparatus performs inverse frequency transform on the first frequency coefficient matrix generated in operation 1730. The image decoding apparatus restores a block of a pixel domain by performing inverse DCT on the first frequency coefficient matrix.

As described above, according to an exemplary embodiment, a frequency coefficient matrix may be encoded based on mathematics at a high compression ratio and thus an overall image compression ratio may be greatly increased.

While an exemplary embodiment has been particularly shown and described with reference to the accompanying drawings, exemplary embodiments can be embodied as computer readable codes on a computer readable recording medium.

For example, the image encoding or decoding apparatus or the image encoder or decoder illustrated in FIG. 1, 2, 4, 5, 9, 10, 14, or 15 may include a bus coupled to every unit of the apparatus or coder, at least one processor that is connected to the bus and is for executing commands, and memory connected to the bus to store the commands, received messages, and generated messages.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of decoding an image, the method comprising:
   obtaining information indicating whether a first frequency coefficient matrix of a predetermined block includes non-zero coefficients;
   when the predetermined block is a block predicted by performing intra prediction, decoding data of a second frequency coefficient matrix based on the obtained information;
   restoring the first frequency coefficient matrix by partially switching at least one of rows and columns of the second frequency coefficient matrix according to an angle parameter based on the obtained information; and
   restoring the predetermined block by transforming the first frequency coefficient matrix to a pixel domain,
   wherein the angle parameter indicates a degree of partial switching between the at least one of rows and columns.

2. The method of claim 1, wherein the decoding data of the second frequency coefficient matrix is performed when the first frequency coefficient matrix includes non-zero coefficients.

3. The method of claim 1, wherein the predetermined block is a block predicted by performing intra prediction.

4. The method of claim 1, wherein the obtaining the data of the second frequency coefficient matrix comprises:
- entropy-decoding the data of the second frequency coefficient matrix and information about the angle parameter if the decoded information indicates that the first frequency coefficient matrix includes non-zero coefficients; and
- inverse-quantizing the decoded second frequency coefficient matrix.

* * * * *